United States Patent
Kawano et al.

(10) Patent No.: US 10,788,902 B2
(45) Date of Patent: Sep. 29, 2020

(54) INFORMATION PROCESSING DEVICE AND INFORMATION PROCESSING METHOD

(71) Applicant: SONY CORPORATION, Tokyo (JP)

(72) Inventors: Shinichi Kawano, Tokyo (JP); Takuya Namae, Kanagawa (JP); Kenji Sugihara, Kanagawa (JP); Ryo Fukazawa, Kanagawa (JP); Daisuke Sato, Tokyo (JP)

(73) Assignee: SONY CORPORATION, Tokyo (JP)

(*) Notice: Subject to any disclaimer, the term of this patent is extended or adjusted under 35 U.S.C. 154(b) by 7 days.

(21) Appl. No.: 16/307,320

(22) PCT Filed: Jun. 8, 2017

(86) PCT No.: PCT/JP2017/021271
§ 371 (c)(1),
(2) Date: Dec. 5, 2018

(87) PCT Pub. No.: WO2017/221720
PCT Pub. Date: Dec. 28, 2017

(65) Prior Publication Data
US 2019/0138117 A1 May 9, 2019

(30) Foreign Application Priority Data
Jun. 22, 2016 (JP) .................................. 2016-123593

(51) Int. Cl.
*G06F 3/0346* (2013.01)
*G06F 3/0484* (2013.01)
(Continued)

(52) U.S. Cl.
CPC .............. *G06F 3/0346* (2013.01); *G06F 3/01* (2013.01); *G06F 3/017* (2013.01); *G06F 3/0383* (2013.01);
(Continued)

(58) Field of Classification Search
CPC combination set(s) only.
See application file for complete search history.

(56) References Cited

U.S. PATENT DOCUMENTS

| 2013/0088642 A1* | 4/2013 | Hsieh ..................... G08C 17/02 348/563 |
| 2013/0144583 A1* | 6/2013 | Hemanthkumar ..... G01V 1/345 703/10 |

(Continued)

FOREIGN PATENT DOCUMENTS

| CN | 103853329 A | 6/2014 |
| CN | 104854539 A | 8/2015 |

(Continued)

OTHER PUBLICATIONS

International Search Report and Written Opinion of PCT Application No. PCT/JP2017/021271, dated Sep. 5, 2017, 09 pages of ISRWO.

(Continued)

*Primary Examiner* — Van N Chow
(74) *Attorney, Agent, or Firm* — Chip Law Group

(57) ABSTRACT

Provided is an information processing device and an information processing method which are capable of simply correcting an indication position in an image which corresponds to a position that is pointed in a three-dimensional space. The information processing device includes an indication position detection unit that detects a spatial indication position that is a position pointed by an indicating object in a three-dimensional space and an indication position correction unit that corrects an image indication position that is an indication position in an image which corresponds to the spatial indication position on the basis of a user voice that is a voice spoken by a user. The present technology is applicable, for example, to a head mount display (HMD) using virtual reality (VR).

17 Claims, 14 Drawing Sheets

(51) Int. Cl.
- *G06F 3/01* (2006.01)
- *G06F 3/16* (2006.01)
- *G06F 3/041* (2006.01)
- *G06F 3/038* (2013.01)

(52) U.S. Cl.
CPC .......... *G06F 3/0418* (2013.01); *G06F 3/0484* (2013.01); *G06F 3/16* (2013.01); *G06F 3/162* (2013.01)

(56) References Cited

U.S. PATENT DOCUMENTS

| | | |
|---|---|---|
| 2014/0164928 A1 | 6/2014 | Kim |
| 2015/0160837 A1* | 6/2015 | Kim ........................ G06F 3/0481 715/708 |
| 2015/0269420 A1* | 9/2015 | Kim ................... G06K 9/00268 382/118 |
| 2016/0147882 A1 | 5/2016 | Li et al. |
| 2016/0379408 A1* | 12/2016 | Wright ................. G06T 19/006 345/633 |

FOREIGN PATENT DOCUMENTS

| | | |
|---|---|---|
| CN | 106104569 A | 11/2016 |
| EP | 2741175 A2 | 6/2014 |
| EP | 3001333 A1 | 3/2016 |
| JP | 2007-048177 A | 2/2007 |
| JP | 2013-088906 A | 5/2013 |
| JP | 2017-513090 A | 5/2017 |
| JP | 2017-517780 A | 6/2017 |
| KR | 2014-0073730 A | 6/2014 |
| KR | 10-2016-0104054 A | 9/2016 |
| KR | 10-2016-0117634 A | 10/2016 |
| WO | 2015/142719 A2 | 9/2015 |
| WO | 2015/172359 A1 | 11/2015 |

OTHER PUBLICATIONS

Mitsuhiko Oki, "Dosa to Hatsuwa no Hikikomi o Riyo shita Buttai Ninshiki Seido no Kojo", Dai 33 Kai Annual Conference of the Robotics Society of Japan Yokoshu DVD-ROM, 2015, entire text.
Jvan Tanev "Accuracy Improvement in Object Recognition Using Motion and utterance attraction," Sep. 3, 2015, 6 pages (including translation).
Jvan Tanev, "Accuracy Improvement in Object Recognition Using Motion and Utterance Attraction", 02 pages.

\* cited by examiner

FIG. 8

| ID | POSITION | SIZE | OBJECT TYPE | CONTENT TYPE | DETAIL INFORMATION ||| ADJACENT OBJECT ||||
|---|---|---|---|---|---|---|---|---|---|---|---|
| | | | | | CONTENT INFORMATION | TRANSLATION INFORMATION (USER LANGUAGE) | COLOR | UPPER | LOWER | LEFT | RIGHT |
| ID1 | p1 | s1 | SIGNBOARD | IMAGE | DOG | DOG | YELLOW | — | — | — | ID2 |
| ID2 | p2 | s2 | WINDOW | OBJECT | WINDOW | WINDOW | TRANSPARENT | — | — | ID1 | ID3 |
| ID3 | p3 | s3 | SIGNBOARD | SENTENCE | ORIGINAL LANGUAGE INFORMATION OF SIGNBOARD 133 | TASTE OF HOME COOKING | ORANGE | — | ID4 | ID2 | — |
| ID4 | p4 | s4 | SIGNBOARD | SENTENCE | ORIGINAL LANGUAGE INFORMATION OF SIGNBOARD 134 | 3F OF THIS BUILDING | GRAY | ID1 | ID5 | — | ID5 |
| ID5 | p5 | s5 | SIGNBOARD | WORD | 7080 | 7080 | BLUE | ID3 | ID7 | ID4 | ID6 |
| ID6 | p6 | s6 | SIGNBOARD | WORD | ORIGINAL LANGUAGE INFORMATION OF SIGNBOARD 136 | RESTAURANT | BLACK | ID3 | — | ID5 | — |
| ID7 | p7 | s7 | SIGNBOARD | SENTENCE | ORIGINAL LANGUAGE INFORMATION OF SIGNBOARD 137 | SPORTS GOODS | LIGHT BLUE | ID5 | — | — | — |

FIG. 12

| ID | POSITION | SIZE | ADJACENT OBJECT ||||  DISTANCE TO ADJACENT OBJECT ||||
| | | | UPPER | LOWER | LEFT | RIGHT | UPPER | LOWER | LEFT | RIGHT |
|---|---|---|---|---|---|---|---|---|---|---|
| ID1 | p1' | s1' | — | ID4 | — | ID2 | — | d1_d | — | d1_r |
| ID2 | p2' | s2' | — | — | ID1 | ID3 | — | — | d2_l | d2_r |
| ID3 | p3' | s3' | — | ID5 | ID2 | — | — | d3_d | d3_l | — |
| ID4 | p4' | s4' | ID1 | — | — | ID5 | d4_u | — | — | d4_r |
| ID5 | p5' | s5' | ID3 | ID7 | ID4 | ID6 | d5_u | d5_d | d5_l | d5_r |
| ID6 | p6' | s6' | ID3 | — | ID5 | — | d6_u | — | d6_l | — |
| ID7 | p7' | s7' | ID5 | — | — | — | d7_u | — | — | — |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/021271 filed on Jun. 8, 2017, which claims priority benefit of Japanese Patent Application No. JP 2016-123593 filed in the Japan Patent Office on Jun. 22, 2016. Each of the above-referenced applications is hereby incorporated herein by reference in its entirety.

TECHNICAL FIELD

The present technology relates to an information processing device, an information processing method, and a program, and more particularly, to an information processing device, an information processing method, and a program which are suitable to be used in a case of correcting an indication position in an image which corresponds to a position pointed in a three-dimensional space.

BACKGROUND ART

In the related art, there is suggested a technology in which a name and the like of a target that is recognized as being pointed by a finger and the like of a user are given in notification with a voice, and are confirmed by the user (for example, refer to Patent Document 1).

In addition, in the related art, there is suggested a technology of selecting a figure or a character by comparing a figure or character candidate which is obtained by recognizing a figure or character which is drawn by a hand, and a figure or character candidate which is obtained by recognizing a voice that is spoken by a user with each other (for example, refer to Patent Document 2).

CITATION LIST

Patent Document

Patent Document 1: Japanese Patent Application Laid-Open No. 2013-88906
Patent Document 2: Japanese Patent Application Laid-Open No. 2007-48177

SUMMARY OF THE INVENTION

Problems to be Solved by the Invention

However, in Patent Documents 1 and 2, a configuration of correcting an indication position in an image which corresponds to a position pointed in a three-dimensional space is not examined.

Here, the present technology is configured to simply correct an indication position in an image which corresponds to a position pointed in a three-dimensional space.

Solutions to Problems

According to an aspect of the present technology, there is provided an information processing device including: an indication position detection unit that detects a spatial indication position that is a position pointed by an indicating object in a three-dimensional space; and an indication position correction unit that corrects an image indication position that is an indication position in an image which corresponds to the spatial indication position on the basis of a user voice that is a voice spoken by a user.

The indication position correction unit can correct the image indication position to a position in the image based on the user voice.

The indication position correction unit can correct the image indication position in the image that is visually recognized the user by virtual reality.

The indication position correction unit may correct the image indication position corresponding to the spatial indication position when the user speaks the user voice.

The indication position detection unit can detect an indication target that is a target in the image which corresponds to a first target that is pointed by the indicating object in a three-dimensional space, and the indication position correction unit cannot correct the indication target in a case where the indication target matches a second target based on the user voice, and can perform correction processing of correcting a target in the image which corresponds to the second target to the indication target in a case where the indication target does not match the second target.

The information processing device can further include an output control unit that controls output of a confirmation voice that is a voice for confirming the indication target. The indication position correction unit can perform the correction processing on the basis of the user voice with respect to the confirmation voice.

The confirmation voice can be a voice that encourages input of information for identifying the indication target.

The output control unit can control output of voice information for giving a notification of information associated with the indication target with a predetermined language in a case where the indication target is changed after the correction processing.

The voice information can include content information indicating visually recognizable content of the indication target.

The content information can indicate at least one of a name of the indication target, a type of the indication target, and a thing that is visually expressed by the indication target.

In a case where the indication target is changed after the correction processing, the output control unit can perform control so that a notification sound for giving a notification of the change of the indication target is output.

The output control unit can perform control so that the notification sound different depending on a movement direction of the indication target is output.

The information processing device can further include a translation unit that translates information associated with the indication target into a predetermined language.

The information processing device can further include an object detection unit that detects an object in the image.

The indicating object can be a part of a body of a user.

The information processing device can further include a voice recognition unit that recognizes the user voice.

According to another aspect of the present technology, there is provided an information processing method including: an indication position detection step of detecting a spatial indication position that is a position pointed by an indicating object in a three-dimensional space; and an indication position correction step of correcting an image indication position that is an indication position in an image which corresponds to the spatial indication position on the basis of a user voice that is a voice spoken by a user.

According to still another aspect of the present technology, there is provided a program that causes a computer to execute processing including: an indication position detection step of detecting a spatial indication position that is a position pointed by an indicating object in a three-dimensional space; and an indication position correction step of correcting an image indication position that is an indication position in an image which corresponds to the spatial indication position on the basis of a user voice that is a voice spoken by a user.

According to the aspects of the present technology, a spatial indication position that is a position pointed by an indicating object in a three-dimensional space is detected, and an image indication position, which is an indication position in an image which corresponds to the spatial indication position, is corrected on the basis of a user voice that is a voice spoken by a user.

Effects of the Invention

According to an aspect of the present technology, it is possible to simply correct an indication position in an image which corresponds to a position pointed in a three-dimensional space.

Furthermore, the effect described here is not limited, and may be any one effect described in the present disclosure.

BRIEF DESCRIPTION OF DRAWINGS

FIG. 8 is a diagram illustrating an example an indication direction information list.

FIG. 12 is a diagram illustrating an example of an in-speech indication direction information list.

MODE FOR CARRYING OUT THE INVENTION

Figure 1:
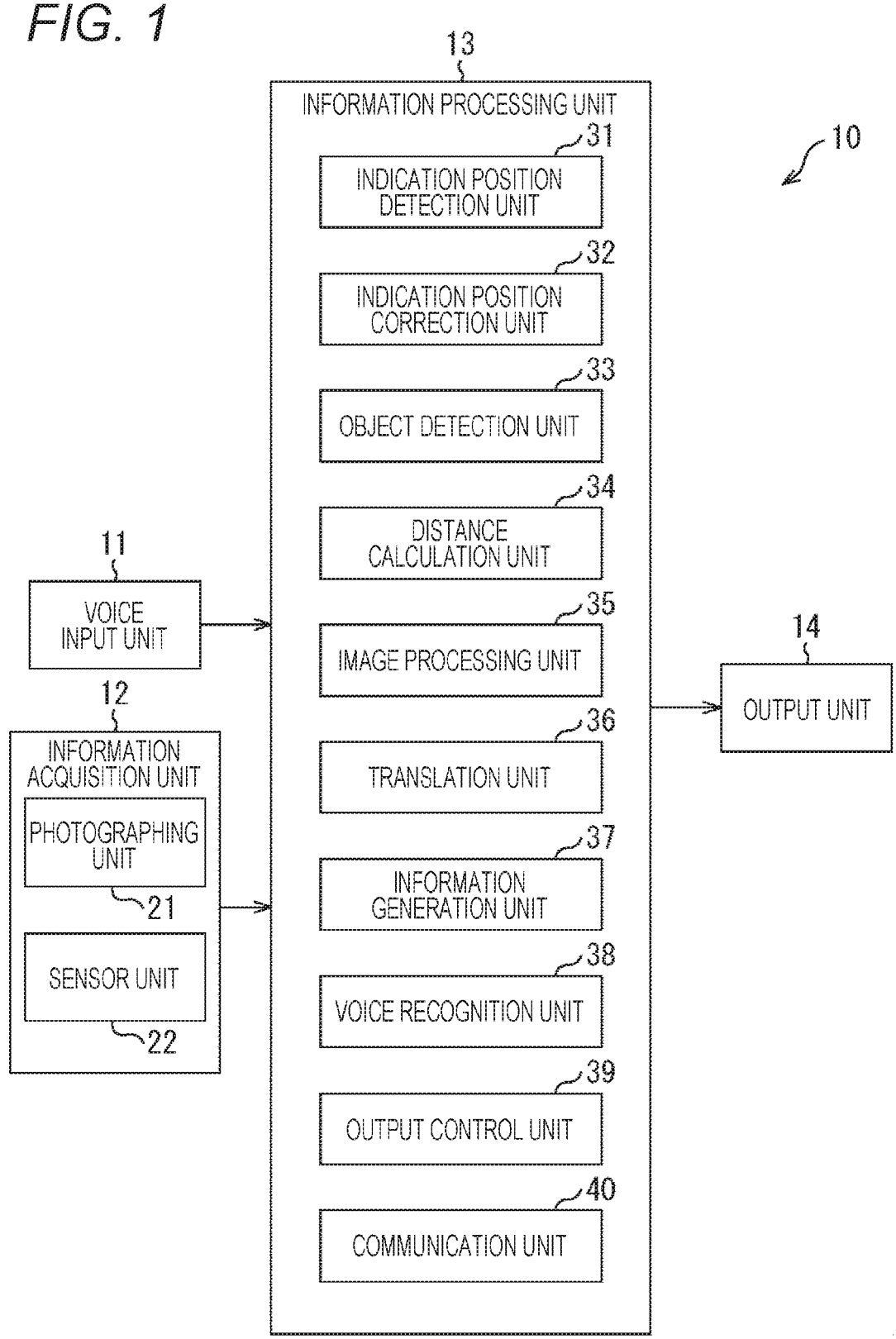
FIG. 1 is a block diagram illustrating an embodiment of an information processing system to which the present technology is applied.

Hereinafter, a mode for carrying out the invention (hereinafter, referred to as "embodiment") will be described in detail with reference to the accompanying drawings. Furthermore, description will be made in the following order.

1. Embodiment
2. Modification Example

1. Embodiment

{Configuration Example of Information Processing System 10}

First, a configuration example of an information processing system 10 to which the present technology is applied will be described with reference to FIG. 1.

For example, the information processing system 10 is a system that is mounted on or carried by a user, recognizes a target that is recognized as being pointed by a user's finger in a three-dimensional space, and gives a notification of content information associated with the target with a voice in a predetermined language. Here, the target that is recognized by the information processing system 10 is a target that is recognized as being pointed by the user, and may be different from a target that is actually pointed by a finger.

Furthermore, hereinafter, the target that is recognized as being pointed by the user, and the target that is actually pointed by the user are referred to as "indication target". In addition, hereinafter, in a case where the target that is recognized as being pointed by the user, and the target that is actually pointed by the user are distinguished, the former is referred to as "user recognition indication target" and the latter is referred to as "actual indication target".

In addition, the content information is information indicating visually recognizable object content. For example, the content information indicates at least one of the name of the object, an object type, and things (hereinafter, referred to as "visual contents") which are visually expressed by the object. Here, examples of the visual contents include an image (a moving image, a still image, a figure, and the like), a character, and a mark which are expressed by the object, and a character, a mark, and a message which are expressed by a shape or movement of the object. In addition, in a case where the object is a human being, examples of the visually recognizable content include a gesture such as a body language and a traffic-control hand signal, and a facial expression.

The information processing system 10 includes a voice input unit 11, an information acquisition unit 12, an information processing unit 13, and an output unit 14.

For example, the voice input unit 11 is constituted by a microphone. For example, the voice input unit 11 is disposed adjacently to a mouth of a user to detect a voice (hereinafter, referred to as "user voice") spoken by the user, and supplies a voice signal indicating the user voice to the information processing unit 13.

For example, the information acquisition unit 12 has a finger ring shape, and is mounted on a finger (for example, a forefinger) that is used when the user points something. The information acquisition unit 12 includes a photographing unit 21 and a sensor unit 22.

The photographing unit 21 photographs a direction (hereinafter, referred to as "indication direction") pointed by the user's finger, and supplies an image (hereinafter, referred to as "indication direction image") obtained from the photographing to the information processing unit 13.

For example, the sensor unit 22 includes a sensor (for example, an acceleration sensor and a gyro sensor) configured to detect a gesture by the user's finger, a position of the finger, an indication direction, and the like. In addition, the sensor unit 22 includes a sensor (for example, a distance sensor) that measures, for example, a distance to an object in the indication direction. In addition, the sensor unit 22 supplies sensor signals indicating detection results of the sensors to the information processing unit 13.

For example, the information processing unit 13 is constituted by a portable information terminal such as a smart phone, a tablet, and a wearable device. The information processing unit 13 includes an indication position detection unit 31, an indication position correction unit 32, an object detection unit 33, a distance calculation unit 34, an image processing unit 35, a translation unit 36, an information generation unit 37, a voice recognition unit 38, an output control unit 39, and a communication unit 40.

The indication position detection unit 31 performs detection of a position and a target which are pointed by the user on the basis of sensor information from the sensor unit 22.

The indication position correction unit 32 performs correction of a detection result of the position and the target which are pointed by the user on the basis of a user voice.

The object detection unit 33 performs detection of an object in the indication direction image.

For example, the distance calculation unit 34 calculates a distance between objects which are detected by the object detection unit 33. In addition, the distance calculation unit 34 calculates, for example, a distance between user's eyes and an object, and a distance between the user's eyes and the user's finger on the basis of the sensor information from the sensor unit 22 and the indication direction image.

The image processing unit 35 performs image processing such as conversion of the indication direction image into an indication direction planar image, and conversion of the indication direction planar image into an in-speech indication direction planar reduced image. Furthermore, details of the indication direction planar image and the in-speech indication direction planar reduced image will be described later.

The translation unit 36 performs translation between two or more languages.

The information generation unit 37 generates an indication direction information list, an in-speech indication direction information list, and the like which indicate information associated with an object that exists in a direction that is pointed by the user. Furthermore, details of the indication direction information list, and the in-speech indication direction information list will be described later. In addition, the information generation unit 37 generates information that is given in notification to the user with a voice.

The voice recognition unit 38 performs recognition of a user voice.

The output control unit 39 controls output of a voice by the output unit 14.

The communication unit 40 performs communication between the voice input unit 11, the information acquisition unit 12, and the output unit 14. Furthermore, a communication method of the communication unit 40 is not limited to a predetermined method, and it is possible to employ an arbitrary method among various communication methods including a wired method and a wireless method. In addition, the communication method between the voice input unit 11, the information acquisition unit 12, and the output unit 14 can be set to methods different from each other.

The output unit 14 is constituted by a device that can output a voice. For example, the output unit 14 is constituted by a speaker, a headphone, an earphone, a sound source, and the like.

Furthermore, for example, the voice input unit 11, the information processing unit 13, and the output unit 14 may be integrated with each other. For example, an integrated device is constituted by a neckband-type wearable device.

{Processing of Information Processing System 10}

Next, processing of the information processing system 10 will be described with reference to FIG. 2 to FIG. 14.

Figure 2:
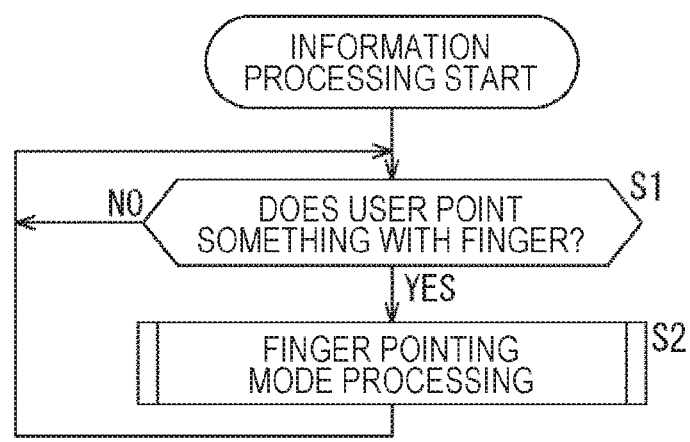
FIG. 2 is a flowchart illustrating information processing that is executed by the information processing system.
Figure 3:
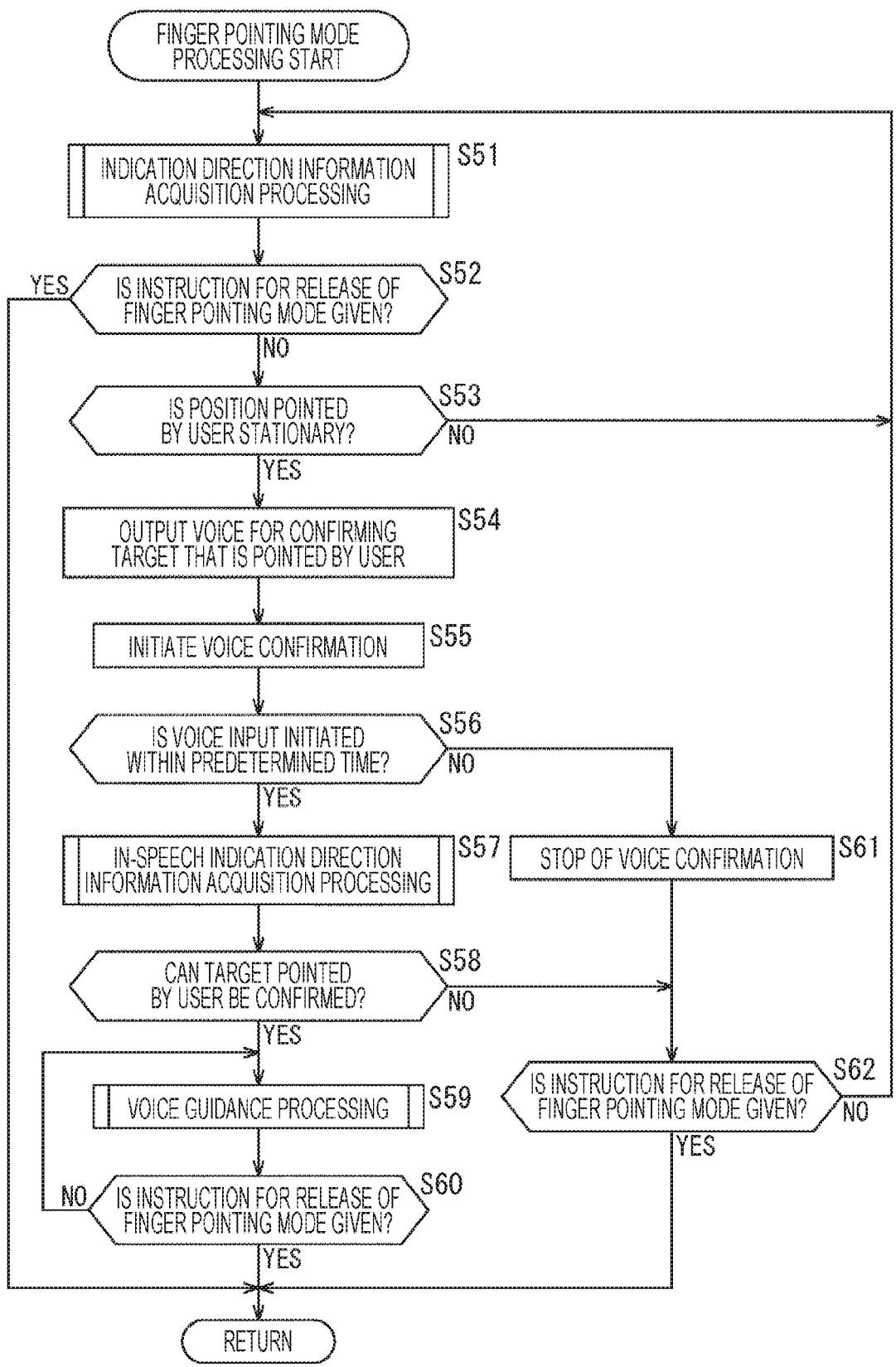
FIG. 3 is a flowchart illustrating details of finger pointing mode processing.
Figure 4:
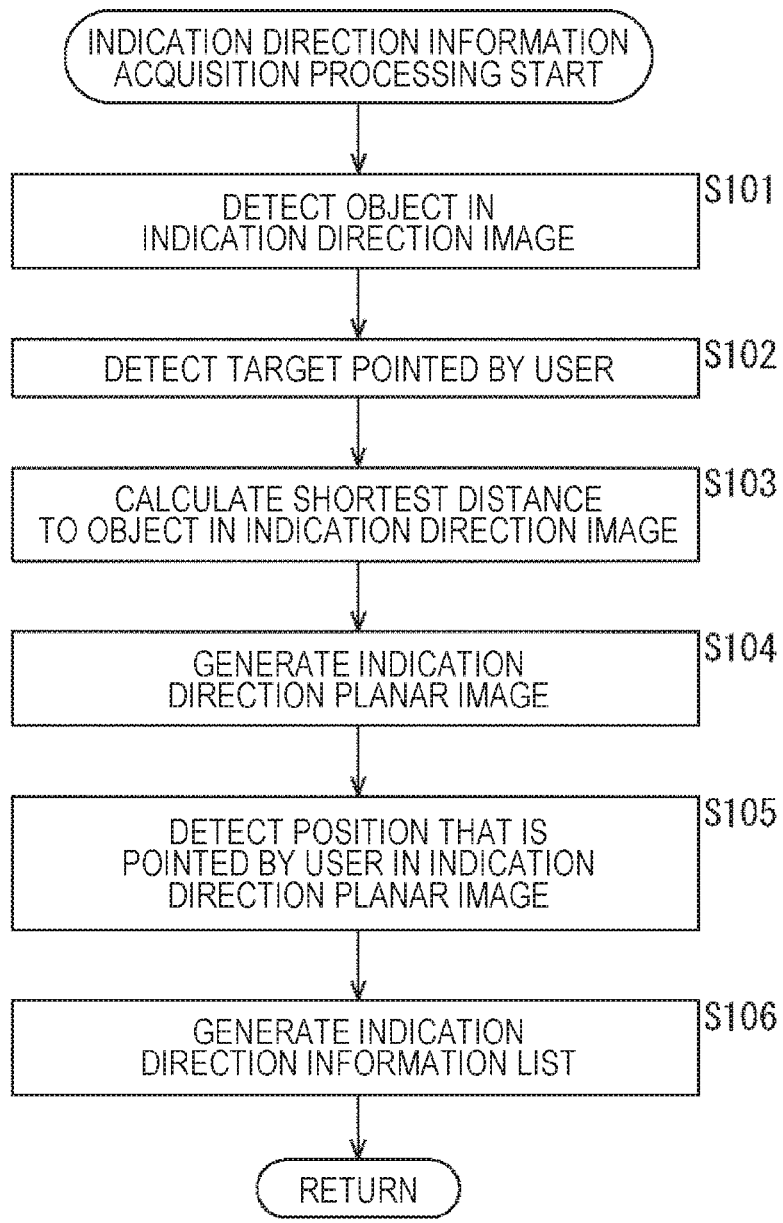
FIG. 4 is a flowchart illustrating details of indication direction information acquisition processing.

First, information processing executed by the information processing system 10 will be described with reference to a flowchart of FIG. 2. Furthermore, for example, the processing is initiated when a power supply (not illustrated) of the information processing unit 13 is turned on, and is terminated when the power supply is turned off.

In step S1, the indication position detection unit 31 determines whether or not the user points something with a finger. Specifically, the indication position detection unit 31 performs detection of a gesture by a user's finger on the basis of a sensor signal transmitted from the sensor unit 22. Furthermore, as a gesture detection method, an arbitrary method can be employed. In addition, the indication position detection unit 31 determines whether or not the user is pointing something with a finger on the basis of a gesture that is detected. The determination processing in step S1 is repetitively executed until it is determined that the user points something with a finger, for example, at a predetermined interval. In addition, in a case where it is determined that the user points something with a finger, the processing proceeds to step S2.

In step S2, the information processing system 10 executes a finger pointing mode processing. Here, details of the finger pointing mode processing will be described with reference to a flowchart of FIG. 3.

In step S51, the information processing unit 13 executes indication direction information acquisition processing. Here, details of the indication direction information acquisition processing will be described with reference to a flowchart of FIG. 4.

In step S101, the object detection unit 33 detects an object in an indication direction image. Specifically, the object detection unit 33 acquires the indication direction image from the photographing unit 21, and performs image recognition to detect an object in the indication direction image, that is, an object that exists within a predetermined range in a direction that is pointed by a user's finger. In addition, the object detection unit 33 detects a position and a size in the indication direction image of the detected object, an object type, visual contents of the object, visual characteristics (for example, a color and a shape) of the object, and the like. In addition, the object detection unit 33 performs recognition of information indicated by the visual contents. For example, the object detection unit 33 recognizes specific contents such as an image, a character string, a mark, and a message which are included in the visual contents.

Furthermore, as an object detection method of the object detection unit 33, an arbitrary method can be employed.

Figure 5:
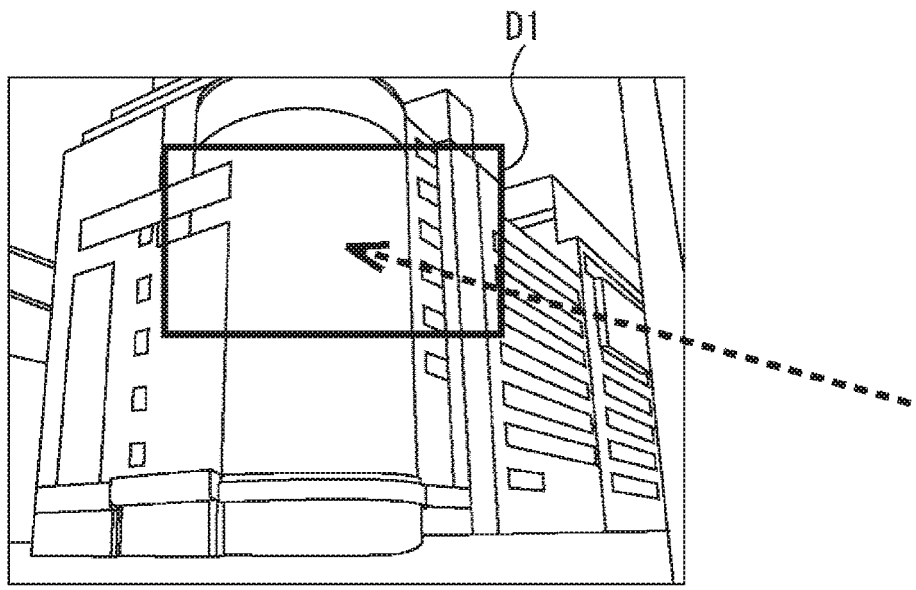
FIG. 5 is a view illustrating an example of a photographing range of an indication direction image.

In addition, hereinafter, description will be given of a case where an image in a range D1 in a landscape of business quarters as illustrated in FIG. 5 is obtained as the indication direction image. Furthermore, in this drawing, signboards of buildings, and the like are not illustrated.

In step S102, the indication position detection unit 31 detects a target (indication target) that is pointed by a user. For example, in a case where an object detected by the object detection unit 33 exists at the center of the indication direction image, the indication position detection unit 31 detects the object as the indication target. On the other hand, in a case where an object detected by the object detection unit 33 does not exist at the center of the indication direction image, the indication position detection unit 31 detects an object closest to the center of the indication direction image as the indication target.

Furthermore, in the following description, the indication target detected by the indication position detection unit 31 is referred to as "system recognition indication target". Basically, the system recognition indication target approximately matches a target (actual indication target) that is actually pointed by the user, but may not match a target (user recognition indication target) that is recognized as being pointed by the user in some cases.

In step S103, the distance calculation unit 34 calculates the shortest distance to an object in the indication direction image. Specifically, the distance calculation unit 34 calculates a distance (hereinafter, referred to as "shortest object distance") between a portion (hereinafter, referred to as "shortest position"), which is closest to user's eyes, in the object in the indication direction image and user's eyes on the basis of the sensor information and the indication direction image.

Figure 6:
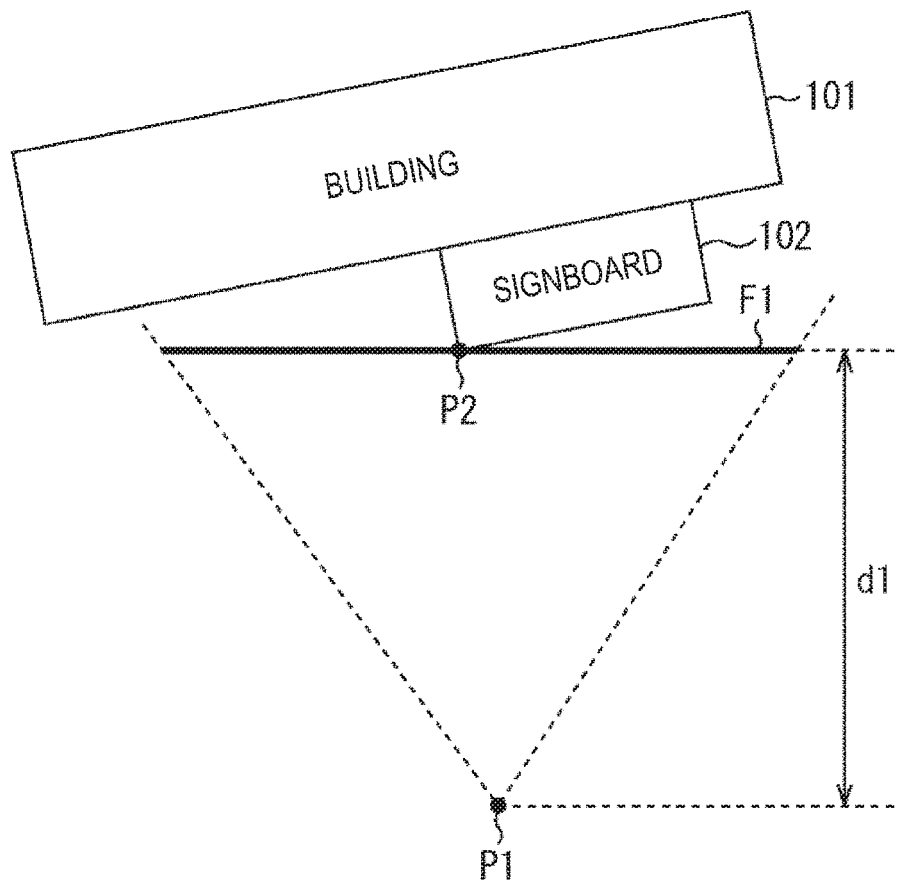
FIG. 6 is a view illustrating a method of generating an indication direction planar image.

Here, a specific example of a method of calculating the shortest object distance will be described with reference to FIG. 6. FIG. 6 is a schematic view when a building 101 and a signboard 102 which are captured in the indication direction image from an upper side. A position P1 represents a position of the user's eye.

The distance calculation unit 34 detects a portion, which is closest to the position P1, in the building 101 and the signboard 102. According to this configuration, for example, a position P2 of a forward-left corner of the signboard 102 is detected as the portion (shortest position) closest to the position P1. In addition, the distance calculation unit 34 calculates a distance d1 between the position P1 and the position P2 as the shortest object distance.

Furthermore, as a method of calculating the shortest object distance, an arbitrary method can be employed.

In step S104, the image processing unit 35 generates an indication direction planar image. For example, the image processing unit 35 generates an image obtained by projecting the indication direction image onto a plane that is perpendicular to the indication direction and passes through the shortest position as the indication direction planar image.

For example, in the example of FIG. 6 described above, an image, which is obtained by projecting the indication direction image onto a plane F1 that passes through the shortest position P2, is obtained as the indication direction planar image.

Figure 7:
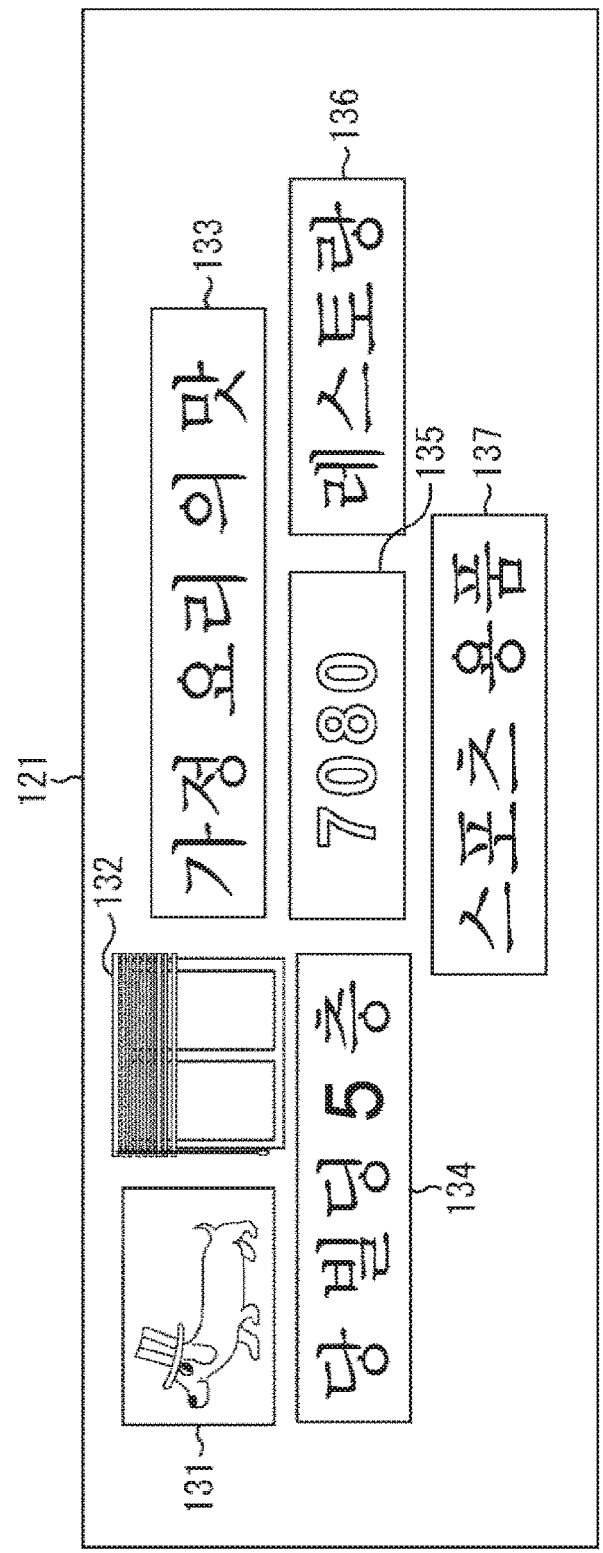
FIG. 7 is a view illustrating an example of the indication direction planar image.
Figure 9:
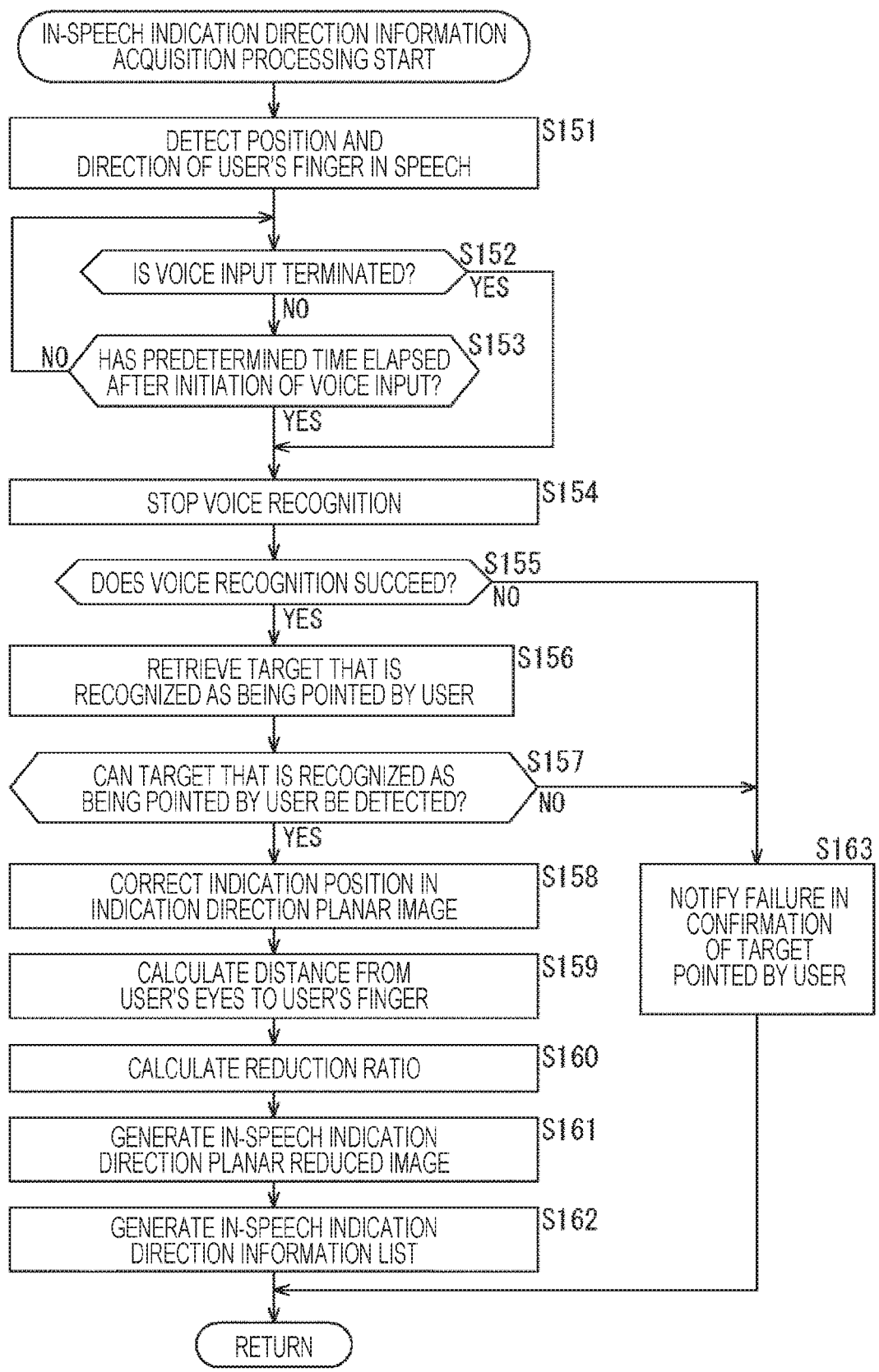
FIG. 9 is a flowchart illustrating details of in-speech indication direction information acquisition processing.

FIG. 7 schematically illustrates a specific example of the indication direction planar image. In an indication direction planar image 121 of FIG. 7, a signboard 131, a window 132, and a signboard 133 to a signboard 137 are captured. Furthermore, the indication direction planar image 121 is illustrated as a monochrome image. However, actually, respective objects have colors. Colors of main portions of the respective objects will be described later.

The signboard 131, the window 132, and the signboard 133 are arranged horizontally from the left to the right. The signboard 134 to the signboard 136 are arranged horizontally from the left to the right on a lower side of the signboard 131, the window 132, and the signboard 133. The signboard 134 is located below the signboard 131 and the window 132. The signboard 135 is located below the signboard 133. The signboard 136 is located below the signboard 133, and further protrudes to the right in comparison to the signboard 133. The signboard 137 is located below the signboard 135.

The signboard 131 has a rectangular shape, and an image (figure) of a dog having a yellow body is displayed on the signboard 131.

The window 132 has an approximately square shape, and a color of a frame is gray.

The signboard 133 has a rectangular shape, and black Korean character strings are displayed on an orange background. The Korean character strings represent "taste of home cooking".

The signboard 134 has a rectangular shape, and black Korean character strings are displayed on a gray background. The Korean character strings represent "5F of this building".

The signboard 135 has a rectangular shape, and blue digits "7080" are displayed on a white background.

The signboard 136 has a rectangular shape, and block Korean character strings are displayed on a white background. The Korean character strings represent "restaurant".

The signboard 137 has a rectangular shape, and black Korean character strings are displayed on a light blue background. The Korean character strings represent "sports good".

In addition, the image processing unit 35 converts positions and sizes of respective objects in the indication direction image detected by the object detection unit 33 into positions and sizes in the indication direction planar image.

Furthermore, with regard to a case where the indication direction planar image 121 in FIG. 7 is obtained, a specific example of each processing will be described.

In step S105, the indication position detection unit 31 detects a position (indication position), which is pointed by a user, in the indication direction planar image. For example, the indication position detection unit 31 detects the center of the system recognition indication target in the indication direction planar image, and sets a detected position as an indication position in the indication direction planar image.

In step S106, the information generation unit 37 generates an indication direction information list. The indication direction information list is a list of a plurality of pieces of information associated with respective objects detected in the indication direction image, and is generated on the basis of the indication direction planar image converted from the indication direction image.

FIG. 8 illustrates an example of the indication direction information list that is generated on the basis of the indication direction planar image 121 in FIG. 7.

The indication direction information list includes items of an ID, a position, a size, an object type, a content type, detail information, and an adjacent object. The detail information includes items of content information, translation information, and a color. The adjacent object includes items of upper, lower, left, and right.

The ID is applied to each object to uniquely identify each object. In this example, an ID1 to an ID7 are respectively applied to the signboard 131, the window 132, and the signboards 133 to 137.

The position represents a position of each object in the indication direction planar image. For example, coordinates of the center of each object in the indication direction planar image are set.

The size represents a size of each object in the indication direction planar image. For example, the maximum value of a length of each object in a vertical direction and the maximum value of a length of each object in a horizontal direction in the indication direction planar image are set.

The object type represents a type of an object detected by the object detection unit 33. For example, the object type of the signboard 131, and the signboards 133 to 137 is "signboard", and the object type of the window 132 is "window".

Basically, the content type represents a type of a visual content of each object detected by the object detection unit 33. However, with regard to an object that does not have the visual content, a visual content type is set to "object". For example, the content type of the signboard 131 is "image". In addition, for example, the content type of the signboards 133, 134, and 137 is "sentence", and the content type of the signboards 135 and 136 is "word". Furthermore, in a case where the visual content relates to character strings, when only one word is included in the character strings, the content type is set to "word", and when two or more words are included in the character strings, the content type is set to "sentence". The window 132 does not include the visual content, and thus the content type is set to "object".

In a case where the content type is an object that is the "object", that is, in the case of an object that does not have the visual content, the object type is set as the content information. On the other hand, in a case where the content type is an object other than the "object", that is, in the case of an object including a visual content, the content of the visual content are set.

For example, the signboard 131 includes an image as the visual content, and thus "dog" that is the content of the image is set as the content information. The window 132 does not have the visual content, and thus "window" that is an object type is set as the content information. The signboards 133 to 137 include a sentence or a word as the visual content, and thus the sentence or the word is set as the content information with an original language (in this example, in the Korean language). That is, in this specification, a plurality of pieces of content information of the signboard 133 to the signboard 137 may be respectively regarded as being defined as "original language information of the signboard 133", "original language information of the signboard 134", "original language information of the signboard 135", "original language information of the signboard 136", and "original language information of the signboard 137".

Information, which is translated into a language (hereinafter, referred to as "user language") used in notification of the content information to a user by the translation unit 36, is set as the translation information. Here, the user language may be regarded as being the same as a language of a user voice.

A characteristic color among colors included in each object is set as the color.

IDs of objects which are adjacent to each object on an upper side, on a lower side, on a left side, and on a right side in the indication direction planar image are set as the adjacent object. For example, since the signboard 133, the signboard 137, the signboard 134, and the signboard 136 are respectively adjacent to the signboard 135 of an ID5 on the upper side, on the lower side, on the left side, and on the right side, ID3, ID7, ID4, and ID6 are respectively set in "upper", "lower", "left", and "right" in a column of "adjacent object".

Then, the indication direction information acquisition processing is terminated.

Returning to FIG. 3, in step S52, the indication position detection unit 31 determines whether or not an instruction for release of the finger pointing mode is given. Specifically, as in the processing of step S1 in FIG. 2, the indication position detection unit 31 performs detection of a gesture by a user's finger on the basis of a sensor signal transmitted from the sensor unit 22, and detects whether or not a gesture that gives an instruction for release of the finger pointing mode is performed. For example, the gesture that gives an instruction for release of the finger pointing mode may be stopping of the finger pointing gesture, or making of a predetermined finger shape. In addition, in a case where the gesture that gives an instruction for release of the finger pointing mode is not performed, the indication position detection unit 31 determines that an instruction for release of the finger pointing mode is not given, and the processing proceeds to step S53.

In step S53, the indication position detection unit 31 determines whether or not a position pointed by the user is stationary. For example, the indication position detection unit 31 measures a duration of a state in which a movement range of a user's finger is within a predetermined range on the basis of sensor information transmitted from the sensor unit 22. In a case where the duration of the state in which the movement range of the user's finger is the predetermined range is shorter than a predetermined time, the indication position detection unit 31 determines that the position that is pointed by the user is not stationary, and the processing returns to step S51.

Then, processing in steps S51 to S53 is repetitively executed until it is determined in step S52 that the instruction for release of the finger pointing mode is given, or it is determined in step S53 that the position pointed by the user is stationary. In addition, the system recognition indication target, the indication direction planar image, the indication position in the indication direction planar image, and the indication direction information list are updated whenever the processing is repeated.

On the other hand, in a case where the duration of the state in which the movement range of the user's finger is in the predetermined range is equal to or longer than the predetermined time, in step S53, the indication position detection unit 31 determines that the position pointed by the user is stationary, and the processing proceeds to step S54.

In step S54, the information processing system 10 outputs a voice (hereinafter, referred to as "confirmation voice") for confirming a target that is pointed by the user. Specifically, first, the information generation unit 37 creates an inquiry sentence for confirming the target that is pointed by the user.

Here, the information generation unit 37 creates the inquiry sentence, for example, on the basis of the content type of the system recognition indication target. For example, in a case where the content type is an image, an inquiry sentence of "which image do you point?" is created. In a case where the content type is a sentence, an inquiry sentence of "which sentence do you point?" is created. In a case where the content type is a word, an inquiry sentence of "which word do you point?" is created. In a case where the content type is an object, an inquiry sentence of "which object do you point?" is created.

Furthermore, the above-described inquiry sentences are illustrative only, and can be changed in correspondence with necessity. For example, the inquiry sentence may be created on the basis of an object type instead of the content type. In addition, the inquiry sentence may be created, for example, on the basis of both the object type and the content type. In addition, for example, an inquiry sentence such as "which do you point?" regardless of the object type and the content type may be created.

However, it is preferable that the inquiry sentence is a sentence that encourages the user to input information for identifying the user recognition indication target so that information with which the user recognition indication target can be identified from other objects is reliably obtained from the user. For example, in the case of making an inquiry of "which do you point?", when the user gives an answer to the inquiry with "signboard", the information processing system 10 cannot recognize which signboard is pointed by the user. In contrast, for example, in the case of making an inquiry of "which word do you point", it is assumed that the user gives an answer to the inquiry with a word on the signboard, and thus the information processing system 10 can easily identify the user recognition indication target on the basis of the answer of the user.

In addition, the output unit 14 outputs a confirmation voice indicating an inquiry sentence under control of the output control unit 39.

In step S55, the voice recognition unit 38 initiates voice recognition.

In step S56, the voice recognition unit 38 determines whether or not voice input is initiated within a predetermined time on the basis of a voice signal transmitted from the voice input unit 11. In a case where it is determined that the voice input is initiated within the predetermined time, the processing proceeds to step S57.

In step S57, the information processing system 10 executes in-speech indication direction information acquisition processing. Here, details of the in-speech indication direction information acquisition processing will be described with reference to a flowchart of FIG. 9.

In step S151, the indication position detection unit 31 detects a position and a direction of a user's finger in speech. Specifically, as in the processing in step S1 in FIG. 2, the indication position detection unit 31 performs detection of a gesture by the user's finger on the basis of a sensor signal transmitted from the sensor unit 22, and detects a position and a direction of a fingertip of the user. In addition, the indication position detection unit 31 sets the detected position and direction of the fingertip of the user as a reference finger position and a reference finger direction. Furthermore, it is possible to obtain a position, which is pointed by the user, in a three-dimensional space in speech by the reference finger position and the reference finger direction.

Furthermore, timing of detecting the reference finger position and the reference finger direction is set, for example, to a predetermined timing during speech of the user such as initiation of speech, after the elapse of a predetermined time from the initiation of speech, and termination of speech. Alternatively, for example, a position and a direction of a fingertip of the user in speech may be stored, and the reference finger position and the reference finger direction may be detected at a timing at which it is determined that movement of the user's finger is the smallest in speech.

In step S152, the voice recognition unit 38 determines whether or not voice input is terminated. In a case where it is determined that voice input is continuing still, the processing proceeds to step S153.

In step S153, the voice recognition unit 38 determines whether or not a predetermined time has elapsed after initiation of voice input. In a case where it is determined that a predetermined time has not elapsed after initiation of voice input, the processing returns to step S152.

Then, the processing in step S152 and step S153 is repetitively executed until it is determined in step S152 that voice input is terminated or it is determined in step S153 that a predetermined time has elapsed after initiation of voice input.

On the other hand, in a case where a soundless period continues for a predetermined time, in step S152, the voice recognition unit 38 determines that voice input is terminated, and the processing proceeds to step S154.

In addition, in step S153, in a case where it is determined that a predetermined time has elapsed after initiation of voice input, the processing proceeds to step S154. This corresponds to a case where voice input is continuously executed for a predetermined time or longer.

In step S154, the voice recognition unit 38 stops voice recognition.

In step S155, the voice recognition unit 38 determines whether or not voice recognition succeeds. In a case where the content of a user voice can be recognized on the basis of a voice signal transmitted from the voice input unit 11, the voice recognition unit 38 determines that voice recognition succeeds, and the processing proceeds to step S156.

In step S156, the indication position correction unit 32 retrieves a target (user recognition indication target) that is recognized as being pointed by the user. For example, the indication position correction unit 32 retrieves text information, which is similar to text information that is acquired from the user voice, among a plurality of pieces of text information included in a plurality of pieces of translation information of respective objects in the latest indication direction information list. That is, the indication position correction unit 32 performs retrieval of an object having translation information data (data obtained by translating content information into a user language) similar to content of the user voice in the latest indication direction information list.

In addition, in a case where only one object having translation information data similar to the content of the user voice exists, the indication position correction unit 32 detects the object as the user recognition indication target. For example, in a case where the user speaks "7080", an object of which translation information data is "7080" is only the signboard 135, and thus the signboard 135 is detected as the user recognition indication target.

On the other hand, in a case where an object having translation information data similar to the content of the user voice cannot be detected, or in a case where two or more objects having translation information data similar to the content of the user voice are detected, the indication position correction unit 32 determines that it fails to detect the user recognition indication target.

In step S157, the indication position correction unit 32 determines whether or not a target (user recognition indication target) that is recognized as being pointed by the user can be detected. In a case where it is determined that the target recognized as being pointed by the user can be detected, the processing proceeds to step S158.

In step S158, the indication position correction unit 32 corrects an indication position in the indication direction planar image.

Specifically, in a case where the user recognition indication target and the latest system recognition indication target match each other, the indication position correction unit 32 does not correct the system recognition indication target. On the other hand, in a case where the user recognition indication target and the latest system recognition indication target do not match each other, the indication position correction unit 32 corrects the system recognition indication target to the user recognition indication target. In addition, the indication position correction unit 32 sets the system recognition indication target at this point of time as the reference indication target.

According to the configuration, it is possible to make the target (user recognition indication target) recognized as being pointed by the user, and the target (system recognition indication target) recognized by the information processing system 10 as being pointed by the user match each other without causing a user to correct pointing.

In addition, the user can set an arbitrary object among objects in the indication direction as the reference indication target. Accordingly, for example, the user can set an object of which an object type, a name, and the like are known, or an object of which the content of visual content is understood as the reference indication target. For example, in the example illustrated in FIG. 7, in a case where the user cannot understand the Korean language, the user can set the reference indication target among the signboard 131, the window 132, and the signboard 135 on which the Korean language is not displayed.

In addition, the indication position correction unit 32 detects the center of the reference indication target in the indication direction planar image, corrects a detected position to a current indication position, and sets the detected position as the reference indication position. The reference indication position becomes an indication position (hereinafter, also referred to as "image indication position") in the indication direction planar image corresponding to an indication position (hereinafter, also referred to as "spatial indication position") in a three-dimensional space in speech, which is obtained by the reference finger position and the reference finger direction which are set in step S151, with respect to the confirmation voice.

In this manner, it is possible to simply correct an image indication position corresponding to the spatial indication position in a manner desired by the user.

Figure 10:
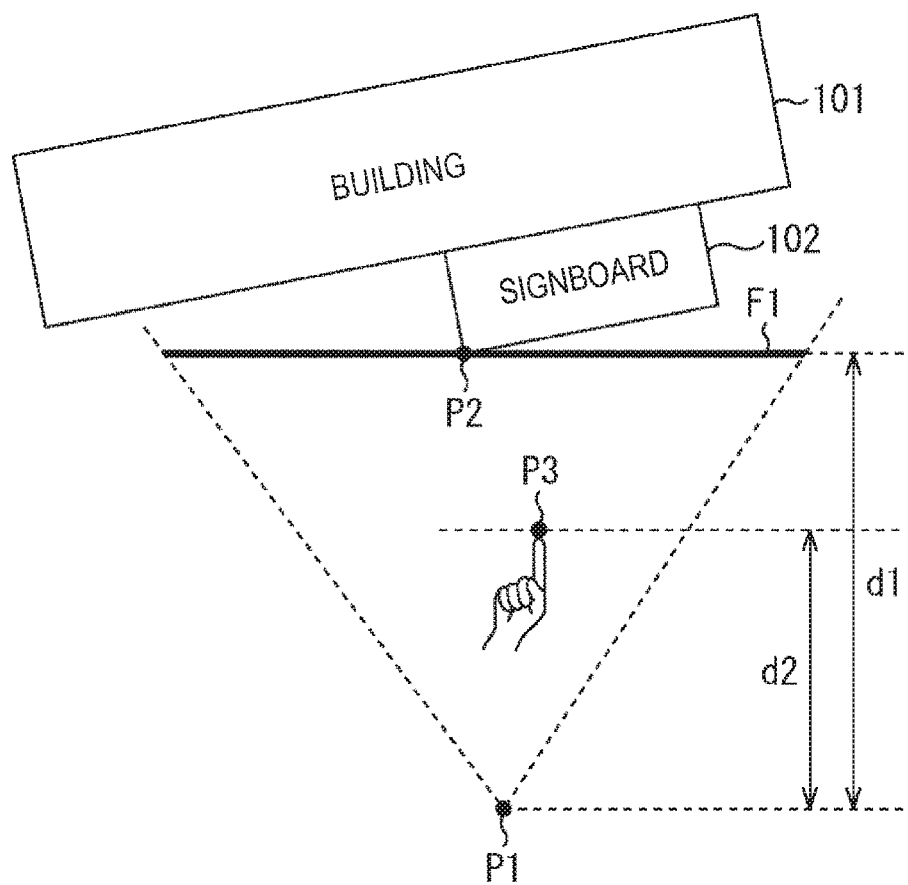
FIG. 10 is a view illustrating a method of generating an in-speech indication direction planar reduced image.

In step S159, the distance calculation unit 34 calculates a distance from user's eyes to a user's finger. Specifically, the distance calculation unit 34 calculates a distance between the user's eyes and the fingertip of the user in speech which is detected in the processing in step S151. For example, as illustrated in FIG. 10, the distance calculation unit 34 calculates a distance d2 (hereinafter, referred to as "eye-to-finger distance d2") between the position P1 of the user's eyes and a position P3 of the fingertip.

Furthermore, as a distance calculation method, an arbitrary method can be employed.

In step S160, the image processing unit 35 calculates a reduction ratio. For example, in the case of the example illustrated in FIG. 10, a reduction ratio r is calculated by the following Expression (1) on the basis of the shortest object distance d1 and the eye-to-finger distance d2.

$$r=d2/d1 \quad (1)$$

In step S161, the image processing unit 35 generates the in-speech indication direction planar reduced image. Specifically, the image processing unit 35 reduces the latest indication direction planar image by the reduction ratio calculated in the processing in step S160, and projects the indication direction planar image onto a plane that passes through the user's fingertip and is parallel to the indication direction planar image, thereby generating the in-speech indication direction planar reduced image.

Figure 11:
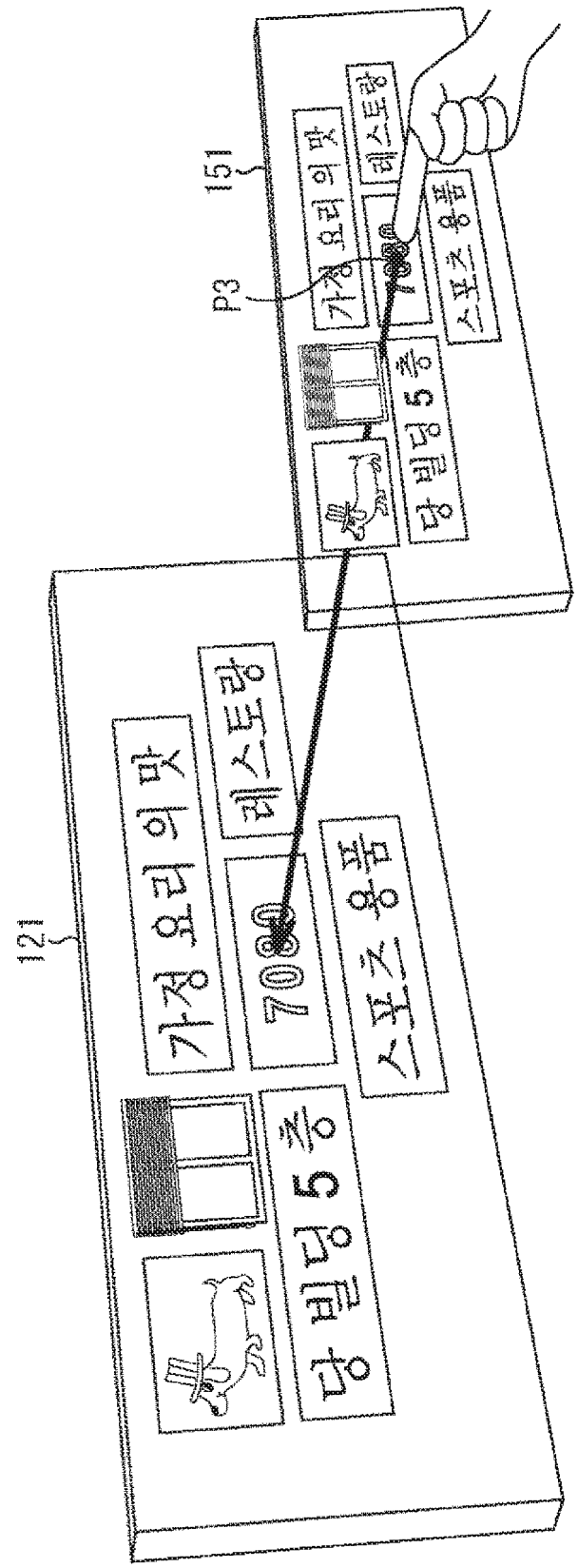
FIG. 11 is a view illustrating the method of generating the in-speech indication direction planar reduced image.

For example, as illustrated in FIG. 11, the indication direction planar image 121 is reduced, and is projected onto a plane that passes through the position P3 of the user's fingertip and is parallel to the indication direction planar image 121, whereby an in-speech indication direction planar reduced image 151 is generated.

In addition, the image processing unit 35 converts positions and sizes of respective objects in the indication direction planar image into positions and sizes in the indication direction planar reduced image. In addition, the image processing unit 35 converts an indication position in the indication direction planar image into an indication position in the indication direction planar reduced image.

In step S162, the information processing system 10 generates an in-speech indication direction information list. Specifically, the distance calculation unit 34 calculates a distance between adjacent objects in the indication direction planar reduced image. The information generation unit 37 substitutes positions and sizes of respective objects in the latest indication direction information list with the positions and sizes in the indication direction planar reduced image. In addition, the information generation unit 37 adds the distance between respective objects, which is calculated by the distance calculation unit 34, to the latest indication direction information list. According to the processing, the in-speech indication direction information list is generated.

FIG. 12 illustrates an example of the in-speech indication direction information list that is generated on the basis of the indication direction information list in FIG. 8. Furthermore, in FIG. 12, items of an object type, a content type, and detail information are not illustrated in the drawing.

When being compared with each other, the in-speech indication direction information list and the indication direction information list in FIG. 8 are different from each other in position data and size data, and an item of a distance to an adjacent object that is newly added.

Specifically, in the in-speech indication direction information list, positions and sizes of respective objects are set as positions and sizes in the in-speech indication direction planar reduced image.

Distances to objects which are adjacent on an upper side, on a lower side, on a left side, and on a right side of respective objects in the in-speech indication direction planar reduced image are set as the distance to an adjacent object. For example, the signboard 134 is adjacent to a lower side of the signboard 131 of ID1, and thus a distance between the signboard 131 and the signboard 134 is set as d1_d in a column of "lower" in "distance to adjacent object" in ID1. In addition, for example, the window 132 is adjacent to the signboard 131 of ID1 from the right, and thus a distance between the signboard 131 and the window 132 is set as d1_r in a column of "right" in "distance to adjacent object" in ID1.

Furthermore, for example, as a distance to an object B that is adjacent to an object A on an upper side or a lower side, a distance in an upper and lower direction (vertical direction) between the center of the object A and the center of the object B is set. In addition, for example, as a distance to an object C that is adjacent to the object A on a left side or on a right side, a distance in a right and left direction (horizontal direction) between the center of the object A and the center of the object C is calculated.

For example, it is possible to understand that an adjacent object can be pointed when a user's finger moves in a certain direction to a certain extent due to the distance data to the adjacent objects.

Figure 13:
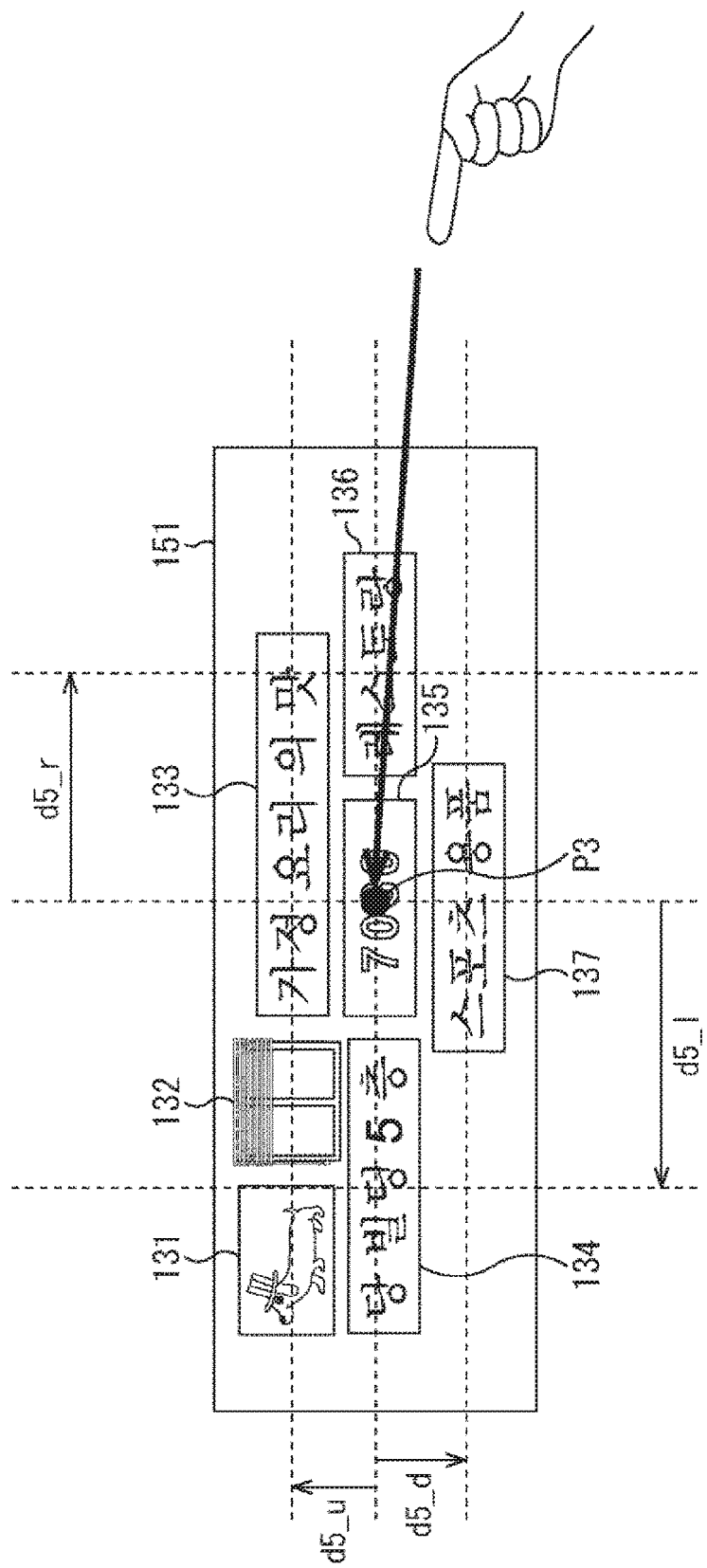
FIG. 13 is a view illustrating an image of the in-speech indication direction planar reduced image.
Figure 14:
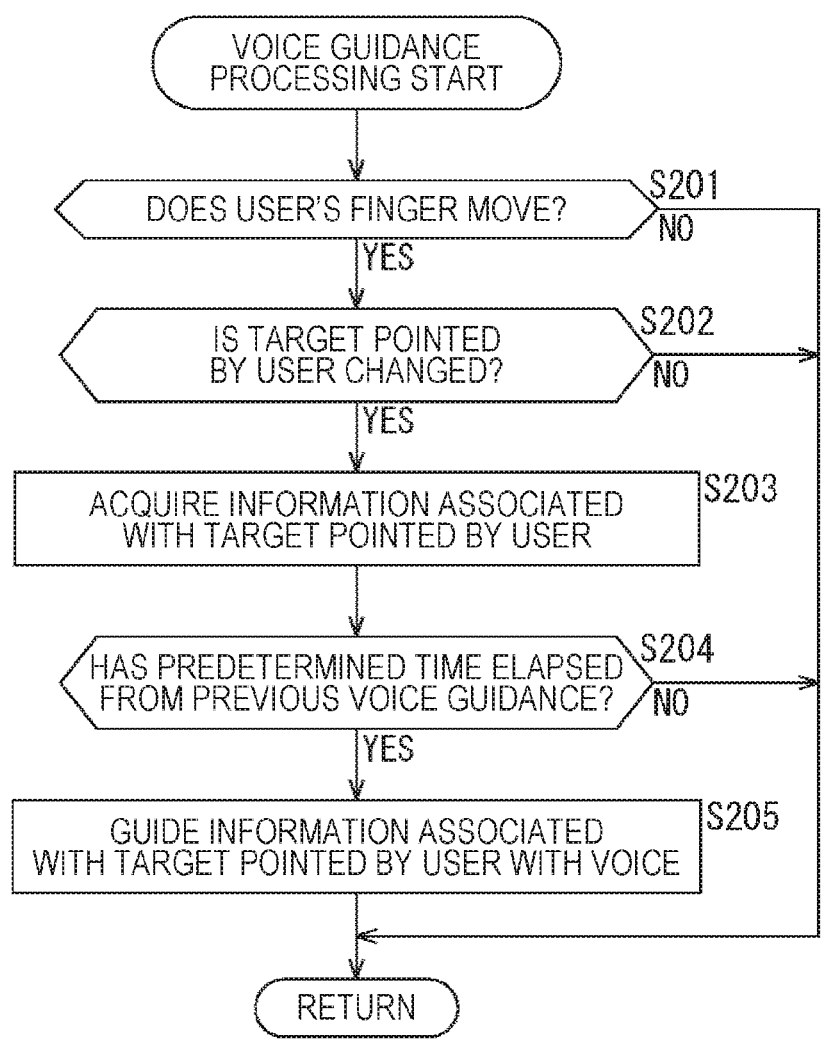
FIG. 14 is a flowchart illustrating details of voice guidance processing.

For example, description will be given of a case where the position P3 that is the center of the signboard 135 is set as an indication position in the in-speech indication direction planar reduced image 151 as illustrated in FIG. 13. For example, it can be seen that when a user's finger is moved in an upward direction by a distance d5_u, approximately the vertical center of the signboard 133, which is adjacent to an upper side of the signboard 135, can be pointed. It can be seen that when the user's finger is moved in a downward direction by a distance d5_d, approximately the vertical center of the signboard 137, which is adjacent to a lower side of the signboard 135, can be pointed. It can be seen that when the user's finger is moved in a left direction by a distance d5_1, approximately the horizontal center of the signboard 134, which is adjacent to a left side of the signboard 135, can be pointed. It can be seen that when the user's finger is moved in a right direction by a distance d5_r, approximately the horizontal center of the signboard 136, which is adjacent to a right side of the signboard 135, can be pointed.

After the processing in step S162, the in-speech indication direction information acquisition processing is terminated.

On the other hand, in step S157, in a case where it is determined that a target that is recognized as being pointed by the user cannot be detected, the processing proceeds to step S163.

In addition, in step S155, in a case where it is determined that voice recognition fails, the processing proceeds to step S163.

In step S163, the information processing system 10 gives a notification of failure in confirmation of a target pointed by the user. For example, the output unit 14 outputs a voice for giving a notification of failure in confirmation of a target pointed by the user under control of the output control unit 39.

Then, the in-speech indication direction information acquisition processing is terminated.

Returning to FIG. 3, in step S58, the indication position correction unit 32 determines whether or not a target pointed by the user can be confirmed. In a case where it is determined that the target pointed by the user can be confirmed, the processing proceeds to step S59.

In step S59, the information processing system 10 executes voice guidance processing. Here, details of the voice guidance processing will be described with reference to a flowchart of FIG. 14.

In step S201, the indication position detection unit 31 determines whether or not the user's finger moves. Specifically, the indication position detection unit 31 detects movement of the user's finger on the basis of a sensor signal transmitted from the sensor unit 22. In addition, in a case where the indication position detection unit 31 determines that the user's finger moves, the processing proceeds to step S202.

In step S202, the indication position detection unit 31 determines whether or not a target (indication target) that is pointed by the user is changed. Specifically, the indication position detection unit 31 detects a current position and a current direction of the user's finger with the reference finger position and the reference finger direction set as a reference on the basis of a sensor signal transmitted from the sensor unit 22. In addition, the indication position detection unit 31 calculates a movement amount and a movement direction of the current indication position from the reference indication position in the in-speech indication direction planar image on the basis of the detected current position and current direction of the user. In addition, the indication position detection unit 31 detects a target (indication target) that is currently pointed by the user on the basis of the calculated movement amount and movement direction of the indication position, and the in-speech indication direction information list. In addition, in a case where the currently detected indication target is different from a previously detected indication target, the indication position detection unit 31 determines that the target pointed by the user is changed, and the processing proceeds to step S203.

In step S203, the output control unit 39 acquires information associated with the target (indication target) pointed by the user. For example, the output control unit 39 acquires translation information data of a current indication target from the in-speech indication direction information list.

In step S204, the output control unit 39 determines whether or not a predetermined time has elapsed from the previous voice guidance. In a case where it is determined that the predetermined time has elapsed from the previous voice guidance, the processing proceeds to step S205. Furthermore, even in a case where voice guidance is performed for the first time after the finger pointing mode processing is initiated, it is determined that the predetermined time has elapsed from the previous voice guidance, the processing proceeds to step S205.

In step S205, the information processing system 10 guides information associated with a target (indication target) pointed by a user with a voice.

For example, first, the output unit 14 outputs a notification sound that is a sound for giving a notification of change of the indication target under control of the output control unit 39. Furthermore, for example, a notification sound different depending on a movement direction (for example, upper, lower, left, and right) of the indication target may be output. In addition, for example, a notification sound, which is different depending on a situation in which a current indication target is spaced away from the reference indication target by how many pieces, may be output. For example, notification sounds, which are different between a case where the current indication target is an object adjacent to the reference indication target and a case where the current indication target is an object spaced away from the reference indication target by two pieces, may be output.

Furthermore, as a method of changing the notification sound, an arbitrary method can be employed. For example, the output control unit 39 changes the notification sound by changing at least one of a scale, sound quality, a sound volume, and the like.

In addition, for example, change of the indication target may be given in notification by vibration and the like of a device instead of the notification sound. In addition, for example, a movement direction of the indication target may be given in notification by a specific voice such as "upper" and "left".

According to the configuration, the user can correctly recognize the indication target that is currently recognized by the information processing system 10 on the basis of the reference indication target. Accordingly, an indication target recognition deviation between the user and the information processing system 10 is prevented.

Next, the output unit 14 outputs voice information for giving a notification of, for example, translation information data of the current indication target under control of the output control unit 39. For example, in a case where a current indication target is the signboard 137 in FIG. 7, a voice of "sports goods" that is translation information data of the signboard 137 is output as the voice information.

According to the configuration, even in a case where information is displayed on the current indication target in the Korean language which cannot be understood, the user can obtain the information in a language that can be understood, that is, in the user language.

In addition, for example, it is difficult for a user to more accurately point a distant object, a small object, an object in objects densely arranged around the object, and the like with a finger and the like from a distant position without coming into direct contact with the object. Accordingly, for example, in the example in FIG. 7, a case where the user points a signboard different from a desired signboard with a finger and thus voice information of the different signboard is out may be assumed. However, when the user cannot understand the Korean language, it is difficult for the user to be aware of the case. In addition, for example, in a case where the user is not confident in a position that is pointed by the user, the user cannot be sure whether or not the output voice information is information that is really desired to obtain.

On the other hand, when using the information processing system 10, an indication target recognition deviation between the user and the information processing system 10 is prevented, and thus the user can reliably obtain information associated with a target that is desired by the user. In addition, the user is confident in the position that is pointed by the user with a finger, and thus the user can be sure that the output voice information is information associated with the target that is desired by the user.

Furthermore, in a case where the indication target is changed, the voice information may not be output immediately after a notification sound is output, and the voice information may be output when the indication target is not changed for a predetermined time, that is, a target that is pointed by the user is determined. According to this configuration, in a case where the user wishes to hear voice information of an object located at a position spaced away from the reference target by two or more pieces, it is not necessary to hear voice information of objects which are located therebetween. In addition, even though the voice information is not output, a notification sound is output, and thus the user can reliably recognize that a target pointed by the user is changed.

In addition, for example, the content information and the translation information data of the indication target may be included in the voice information. That is, the content information of the indication target in the original language, and the content information in the user language may be included in the voice information. According to this configuration, the user can know the pronunciation and the like of the content information of the indication target in the original language.

Then, the voice guidance processing is terminated.

On the other hand, in step S204, in a case where it is determined that the predetermined time has not elapsed yet from the previous voice guidance, the processing in step S205 is skipped, and the voice guidance processing is terminated.

In addition, in step S202, in a case where it is determined that a target that is pointed by the user is not changed, the processing in steps S203 to S205 is skipped, and the voice guidance processing is terminated.

In addition, in step S201, in a case where it is determined that the user's finger does not move, the processing in steps S202 to S205 is skipped, and the voice guidance processing is terminated.

Returning to FIG. 3, in step S60, determination is made as to whether or not an instruction for release of the finger pointing mode is given as in the processing in step S52. In a case where it is determined that the instruction for release of the finger pointing mode is not given, the processing returns to step S59.

Then, in step S60, the processing in steps S59 and S60 is repetitively executed until it is determined that the instruction for release of the finger pointing mode is given.

On the other hand, in step S60, in a case where it is determined that the instruction for release of the finger pointing mode is given, the finger pointing mode processing is terminated.

In addition, in step S56, in a case where it is determined that voice input is not initiated within a predetermined time, the processing proceeds to step S61.

In step S61, the voice recognition unit 38 stops voice recognition.

Then, the processing proceeds to step S62.

On the other hand, in step S58, in a case where it is determined that a target pointed by the user cannot be confirmed, the processing proceeds to step S62.

In step S62, it is determined whether or not an instruction for release of the finger pointing mode is given as in the processing in step S52. In a case where it is determined that the instruction for release of the finger pointing mode is not given, the processing returns to step S51.

Then, the processing in step S51 and subsequent steps is executed.

On the other hand, in step S62, in a case where it is determined that the instruction for release of the finger pointing mode is given, the finger pointing mode processing is terminated.

Returning to FIG. 2, after the processing in step S2, the processing returns to step S1, and the processing in step S1 and subsequent steps is executed.

As described above, the system recognition indication target is corrected on the basis of the user voice, and thus it is possible to make the user recognition indication target and the system recognition indication target match each other in a simple and rapid manner without causing the user to correct pointing. That is, it is possible to synchronize recognition of a position, which is pointed by the user, between the user and the information processing system 10 in a simple and rapid manner.

In addition, the user can accurately understand the indicating target that is recognized by the information processing system 10 on the basis of the reference indication target, and thus it is possible to prevent indication target recognition deviation between the user and the information processing system 10.

In addition, the content information of the indication target is output with a voice in a language which the user can understand, and thus, for example, even in a case where visual content is displayed in a language which the user cannot understand, the user can easily understand the content thereof.

2. Modification Example

Hereinafter, a modification example of the embodiment of the present technology will be described.

{Modification Example Related to Application Range of Present Technology}

An application range of the present technology is not limited to the above-described examples.

For example, in the present technology, an object that becomes the indication target is not necessary to be the entirety of one object, and may be a part of the object. For example, in a case where a plurality of character strings or images are displayed on one signboard, a part of the plurality of character strings or images may be designated as the indication target. In addition, for example, a part of a big target such as a building may be designated as the indication target.

In addition, for example, the present technology is also applicable to calibration of an indication position by an indicating object.

For example, the present technology is applicable to calibration of a position of an operating object in a case where the operating object (for example, a pointer) is moved in an image by a gesture of a user. For example, the present technology is applicable to calibration of a position of an operating object in an image (for example, referred to as "VR image") that is visually recognized by a user by virtual reality (VR) in a head mount display (HMD) and the like, and an operating object in a smart television screen.

For example, a case where the operating object moves within a VR image in conformity to movement of a fingertip of a forefinger of the user will be described. In this case, the indicating object is the forefinger, and an indication position (spatial indication position) in a three-dimensional space is the fingertip of the forefinger.

For example, in a state in which the forefinger is stopped at a desired position in the three-dimensional space, the user performs calibration of a position of the operating object by inputting an indication position (image indication position) in the VR image, which is desired to be correlated with the spatial indication position in this state, of the operating object with a voice. For example, when the user inputs a voice of "center", a coordinate system (a coordinate system of an image indication position) is corrected so that a spatial indication position in speech corresponds to the center of the VR image. In addition, the position of the operating object is corrected so that the indication position (image indication position) of the operating object becomes the center of the VR image.

Furthermore, for example, calibration of the position of the operating object may be performed by inputting a specific coordinate system in the VR image with a voice.

In addition, for example, it is also possible to correct the indication position of the operating object with respect to the VR image by moving a range of the VR image in a state in which the position of the operating object is fixed. For example, the range of the VR image may be moved so that a position in the VR image which is indicated by the user matches the indication position of the operating object by inputting a specific position in the VR image with a voice by the user in a state in which the position of the operating object is fixed.

According to this configuration, it is possible to simply correct an image indication position, which corresponds to the spatial indication position, to a position that is desired by the user.

In addition, the technology of the calibration is also applicable, for example, to calibration of a position of an operating object of augmented reality (AR).

In addition, description has been given of an example of a case where a distant signboard and the like are pointed as an application situation of the present technology. However, the present technology is also applicable to various situations in which a desired position is pointed in a contactless manner by using an indicating object. Examples of the situations include the case of pointing a desired position in a showcase of a museum and the like, the case of pointing a desired position in a location that is difficult to approach due to entrance restriction, the case of pointing a desired position in a landscape in front of an observation tower, the case of pointing a desired position of an object with which direct contact is difficult due to contamination, the case of pointing a desired position of an object for which contact is prohibited, and the case of pointing a desired position from a distant position in a lecture meeting and the like.

In addition, for example, the present technology is also applicable to the case of pointing a desired position through direct contact with a target. For example, the present technology is also applicable to the case of bringing a finger and the like into direct contact with a screen of a display device such as a display to point a desired position in an image displayed on the screen. Particularly, in a case where an image is small and thus it is difficult to accurately point individual targets, an application effect of the present technology is enhanced. Furthermore, in this case, the spatial indication position and the image indication position approximately match each other.

In addition, the present technology is applicable to various devices in which a position (spatial indication position) pointed by an indicating object is detected in a three-dimensional space, and a position (image indication position) in an image, which corresponds to the spatial indication position, is set. Examples of the devices include a wearable device, a VR device, an AR device, a smart television, a digital signage, a projector, a smartphone, and a tablet.

In addition, the type of images capable of being used in the present technology is not particularly limited. For example, the present technology is applicable in the case of setting an image indication position in an arbitrary type of image such as a moving image, a still image, a two-dimensional image, a three-dimensional image, and an omnidirectional image.

{Modification Example Related to Configuration Example of System}

The configuration example of the information processing system 10 in FIG. 1 is illustrative only, and can be changed in correspondence with the necessity.

For example, partial functions of the information processing unit 13 may be provided in the voice input unit 11, the information acquisition unit 12, or the output unit 14. In addition, for example, two or more of the voice input unit 11, the information acquisition unit 12, the information processing unit 13, and the output unit 14 may be integrated with each other. In addition, for example, constituent elements of the information processing system 10 may be configured by a combination different from the voice input unit 11, the information acquisition unit 12, the information processing unit 13, and the output unit 14.

In addition, for example, partial functions of the information processing system 10 may be provided at the outside.

{Modification Example Related to Detection Method of Indication Target}

Description has been given of an example in which an indication target pointed by a user's finger is detected on the basis of an indication direction image photographed by the photographing unit 21 of the information acquisition unit 12 that is mounted on the user's finger, but the indication target may be detected by another method.

For example, a photographing unit that photographs an indication direction image that indicates a direction pointed by a user may be mounted on a portion (for example, a head) other than the user's finger, and a photographing unit that photographs the user may be additionally provided. In this case, for example, the indication position detection unit 31 detects a direction (hereinafter, referred to as "spatial indication direction") pointed by the user in a three-dimensional space by detecting a position and a direction of the user's finger, and the like on the basis of an image obtained by photographing the user. In addition, the indication position detection unit 31 detects an indication target, which is pointed by the user, in the indication direction image on the basis of the spatial indication direction.

Furthermore, in a case where the photographing unit that photographs the indication direction image is mounted on a portion other than the user's finger, a photographing direction and a direction pointed by the user may not match each other in some cases. In contrast, for example, the indication position detection unit 31 can create a spatial map of the periphery of the user on the basis of the indication direction image by using a simultaneous localization and mapping (SLAM), and can detect the indication target on the basis of the spatial map and the spatial indication direction.

In addition, for example, the photographing unit that photographs the indication direction image may be provided separately from the user without being mounted on the user.

{Modification Example Related to Indicating Object}

As the indicating object capable of being applied to the present technology, an arbitrary indicating object can be employed as long as the indicating object can point a desired position. For example, a part of body other than the user's finger, such as an eye, a head, a face, a part of the face, an arm, and a part of the arm may be used as the indicating object, and the desired position may be pointed by a gesture and the like using the portions. In addition, for example, a pointing device such as a laser pointer, and a device such as a virtual reality (VR) device may be used as the indicating object. Furthermore, in the case of using the VR device as the indicating object, for example, a desired direction can be pointed by a direction of, for example, the VR device.

{Modification Example Related to Indication Direction Information List and In-Speech Indication Direction Information List}

Items of the indication direction information list and the in-speech indication direction information list are not limited to the above-described example, and can be changed in correspondence with necessity. For example, the detail information may include visual characteristics (for example, a shape) other than colors of respective objects.

In addition, description has been given of an example in which the user recognition indication target is retrieved by using the translation information data of the indication direction information list, but another type of data may be used. For example, a confirmation voice, which makes an inquiry for visual characteristics of an object, such as "How many colors a pointed object has?" and "please let me know a shape of the pointed object" may be output, and the user recognition indication target may be retrieved from the indication direction information list on the basis of the visual characteristics of the object. In addition, for example, the user recognition indication target may be retrieved in combination of two or more types of data of the indication direction information list.

In addition, a method of classifying the object type and the content type is not limited to the above-described examples, and can be changed in correspondence with necessity.

In addition, for example, information associated with an object that is adjacent in an inclined direction may be added to the indication direction information list and the in-speech indication direction information list to detect movement of the indication target in the inclined direction.

Other Modification Examples

Description has been given of an example in which the content information of the indication target is translated from the Korean language into the user language, but a combination of translation languages is not limited to the example. In addition, for example, a language (a language used in notification to a user) of a translation destination may be set by the user.

In addition, for example, text data of the content information may be displayed on a display and the like instead of using a voice of the content information.

In addition, for example, the indication target and the periphery thereof may be displayed in an enlarged manner for easiness of viewing of the content information of the indication target. According to this configuration, for example, in a case where the indication target is a signboard, in a case where visibility is bad due to a situation in which the signboard is far away, a situation in which characters on the signboard are small, a situation in which reflection of the signboard is strong, a situation in which the periphery is dark, and the like, it is possible to enhance visibility.

In addition, description has been given of an example in which the user who points a desired target by using an indicating object, and a user who input a user voice to the information processing system 10 are the same as each other, but it is not necessary for the users are the same as each other. For example, another user B different from a user A who carries the information processing system 10 may input the user voice. In this case, for example, the user A may provide a command for permission of voice input by the user B to the information processing system 10. For example, the command may be input by the user A with a voice command.

In addition, for example, the user B may carry another system, and a combination of a gesture that gives an instruction for a desired target and a user voice may be acquired in cooperation between systems of the user A and the user B.

{Configuration Example of Computer}

The above-described series of processing can be executed by hardware or software. In the case of executing the series of processing by software, a program that constitutes the software is installed in a computer. Here, examples of the computer include a computer provided with exclusive hardware, and for example, a general-purpose personal computer capable of executing various functions by installing various programs.

Figure 15:
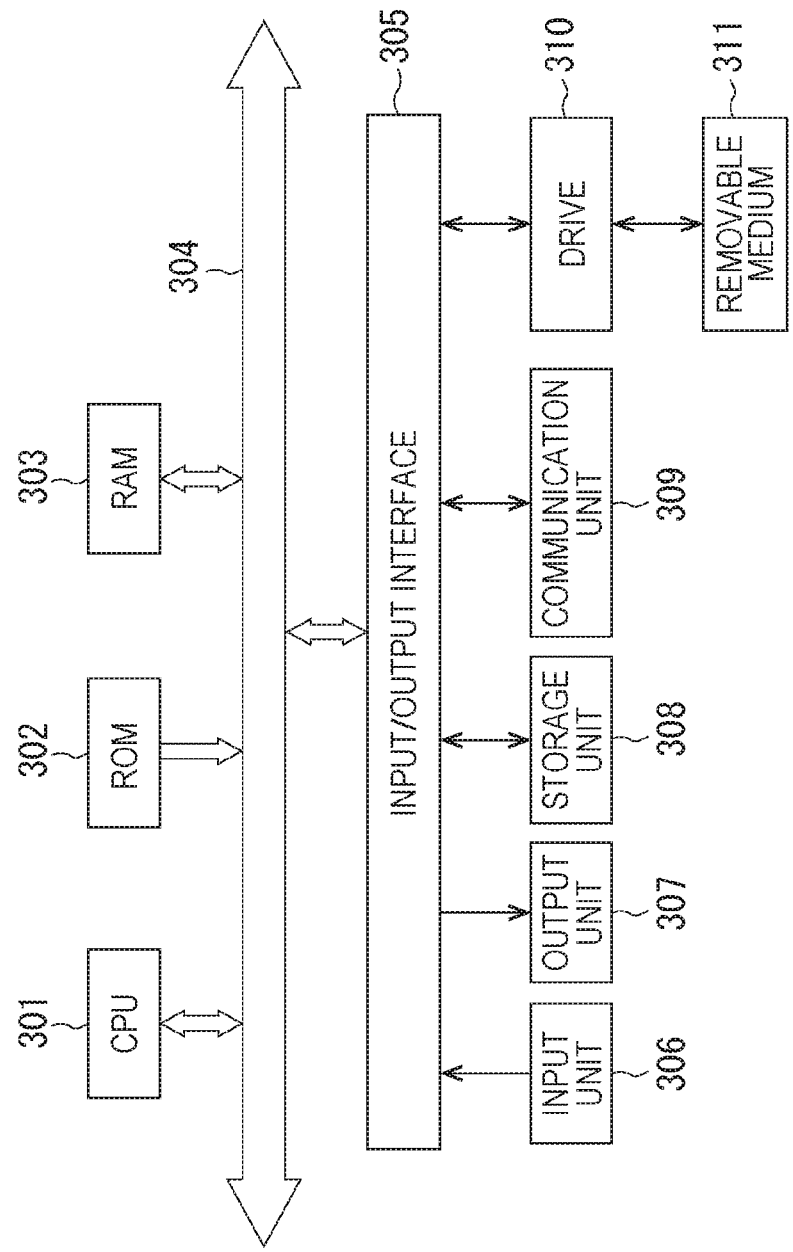
FIG. 15 is a block diagram illustrating a configuration example of a computer.

FIG. 15 is a block diagram illustrating a configuration example of computer hardware that executes the above-described series of processing by a program.

In the computer, a central processing unit (CPU) 301, a read only memory (ROM) 302, and a random access memory (RAM) 303 are connected to each other through a bus 304.

In addition, an input/output interface 305 is connected to the bus 304. An input unit 306, an output unit 307, a storage unit 308, a communication unit 309, and a drive 310 are connected to the input/output interface 305.

The input unit 306 includes a keyboard, a mouse, a microphone, and the like. The output unit 307 includes a display, a speaker, and the like. The storage unit 308 includes a hard disk, a non-volatile memory, and the like. The communication unit 309 includes a network interface, and the like. The drive 310 drives a removable medium 311 such as a magnetic disk, an optical disc, a magneto-optical disc, and a semiconductor memory.

In the computer having the above-described configuration, the CPU 301 loads a program stored, for example, in the storage unit 308 into the RAM 303 through the input/output interface 305 and the bus 304 and executes the program, whereby the above-described series of processing is performed.

The program that is executed by the computer (CPU 301) can be provided, for example, in a state of being recorded in the removable medium 311 as package media, and the like. In addition, the program can be provided through a wired or wireless transmission medium such as a local area network, the Internet, and digital satellite broadcasting.

In the computer, when the removable medium 311 is mounted in the drive 310, the program can be installed in the storage unit 308 through the input/output interface 305. In addition, the program can be received by the communication unit 309 through a wired or wireless transmission medium, and can be installed in the storage unit 308. In addition, the program can be installed in the ROM 302 or the storage unit 308 in advance.

Furthermore, the program that is executed by the computer may be a program in which processing is performed in time-series according to the procedure described in this specification, or may be a program in which processing is performed in parallel or at a necessary timing such as when a call is made.

In addition, a plurality of the computers may perform the above-described processing in cooperation with each other. In addition, a computer system is constituted by a single computer or a plurality of computers which perform the above-described processing.

In addition, in this specification, the system represents an assembly of a plurality of constituent elements (devices, modules (parts), and the like), and whether or not the entirety of the constituent elements exist in the same casing does not matter. Accordingly, all of a plurality of devices which are accommodated in individual casings and are connected through a network, and one device in which a plurality of modules are accommodated in one casing represent the system.

In addition, an embodiment of the present technology is not limited to the above-described embodiment, and various modifications can be made in a range not departing from the gist of the present technology.

For example, the present technology can have a cloud computing configuration in which one function is shared by a plurality of devices and is processed in cooperation through a network.

In addition, the respective steps described in the flowchart can be executed in a state of being shared by a plurality of devices in addition to execution by one device.

In addition, in a case where a plurality of kinds of processing are included in one step, the plurality of kinds of processing included in one step can be executed in a state of being shared by a plurality of devices in addition to execution by one device.

In addition, the effects described in this specification are illustrative only, and other effects may be provided.

In addition, for example, the present technology can also employ the following configurations.

(1) An information processing device, including:
an indication position detection unit that detects a spatial indication position that is a position pointed by an indicating object in a three-dimensional space; and
an indication position correction unit that corrects an image indication position that is an indication position in an image which corresponds to the spatial indication position on the basis of a user voice that is a voice spoken by a user.

(2) The information processing device according to (1), in which the indication position correction unit corrects the image indication position to a position in the image based on the user voice.

(3) The information processing device according to (2), in which the indication position correction unit corrects the image indication position in the image that is visually recognized by the user by virtual reality.

(4) The information processing device according to any one of (1) to (3),
in which the indication position correction unit corrects the image indication position corresponding to the spatial indication position when the user speaks the user voice.

(5) The information processing device according to (1),
in which the indication position detection unit detects an indication target that is a target in the image which corresponds to a first target that is pointed by the indicating object in a three-dimensional space, and
the indication position correction unit does not correct the indication target in a case where the indication target matches a second target based on the user voice, and performs correction processing of correcting a target in the image which corresponds to the second target to the indication target in a case where the indication target does not match the second target.

(6) The information processing device according to (5), further including:
an output control unit that controls output of a confirmation voice that is a voice for confirming the indication target,
in which the indication position correction unit performs the correction processing on the basis of the user voice with respect to the confirmation voice.

(7) The information processing device according to (6),
in which the confirmation voice is a voice that encourages input of information for identifying the indication target.

(8) The information processing device according to any one of (5) to (7),
in which the output control unit controls output of voice information forgiving a notification of information associated with the indication target with a predetermined language in a case where the indication target is changed after the correction processing.

(9) The information processing device according to (8),
in which the voice information includes content information indicating visually recognizable content of the indication target.

(10) The information processing device according to (9),
in which the content information indicates at least one of a name of the indication target, a type of the indication target, and a thing that is visually expressed by the indication target.

(11) The information processing device according to any one of (8) to (10),
in which in a case where the indication target is changed after the correction processing, the output control unit performs control so that a notification sound for giving a notification of the change of the indication target is output.

(12) The information processing device according to (11),
in which the output control unit performs control so that the notification sound different depending on a movement direction of the indication target is output.

(13) The information processing device according to any one of (8) to (12), further including:
a translation unit that translates the information associated with the indication target into the predetermined language.

(14) The information processing device according to any one of (5) to (13), further including:
an object detection unit that detects an object in the image.

(15) The information processing device according to any one of (1) to (14), in which the indicating object is a part of a body of a user.

(16) The information processing device according to any one of (1) to (15), further including:

a voice recognition unit that recognizes the user voice.

(17) An information processing method, including:

an indication position detection step of detecting a spatial indication position that is a position pointed by an indicating object in a three-dimensional space; and an indication position correction step of correcting an image indication position that is an indication position in an image which corresponds to the spatial indication position on the basis of a user voice that is a voice spoken by a user.

(18) A program that causes a computer to execute processing including:

an indication position detection step of detecting a spatial indication position that is a position pointed by an indicating object in a three-dimensional space; and an indication position correction step of correcting an image indication position that is an indication position in an image which corresponds to the spatial indication position on the basis of a user voice that is a voice spoken by a user.

REFERENCE SIGNS LIST

10 Information processing system
11 Voice input unit
12 Information acquisition unit
13 Information processing unit
14 Output unit
21 Photographing unit
22 Sensor unit
31 Indication position detection unit
32 Indication position correction unit
33 Object detection unit
34 Distance calculation unit
35 Image processing unit
36 Translation unit
37 Information generation unit
38 Voice recognition unit
39 Output control unit

The invention claimed is:

1. An information processing device, comprising:
an indication position detection unit configured to:
  detect a spatial indication position, wherein the spatial indication position is a position pointed by an indicating object in a three-dimensional space; and
  detect an indication target in an image, wherein the indication target corresponds to a first target pointed by the indicating object in the three-dimensional space; and
an indication position correction unit configured to:
  correct an image indication position in the image, wherein
  the image indication position corresponds to the spatial indication position, and
  the image indication position is corrected based on a user voice spoken by a user;
  perform no correction of the indication target based on a match between the indication target and a second target based on the user voice; and
  correct a target in the image which corresponds to the second target to the indication target, wherein the target in the image is corrected based on the indication target that does not match the second target.

2. The information processing device according to claim 1, wherein the indication position correction unit is further configured to correct the image indication position to a position in the image based on the user voice.

3. The information processing device according to claim 2, wherein the indication position correction unit is further configured to correct the image indication position in the image that is visually recognized by the user by virtual reality.

4. The information processing device according to claim 1, wherein the indication position correction unit is further configured to correct the image indication position corresponding to the spatial indication position based on the user voice.

5. The information processing device according to claim 1, further comprising:
an output control unit configured to control output of a confirmation voice confirmation of the indication target,
wherein the indication position correction unit is further configured to correct the target in the image based on the user voice with respect to the confirmation voice.

6. The information processing device according to claim 5, wherein the confirmation voice encourages input of information for identification of the indication target.

7. The information processing device according to claim 5, wherein
the output control unit is further configured to control output of voice information that gives a notification of information associated with the indication target with a determined language, and
the output of the voice information is controlled based on a change of the indication target after the correction of the target in the image.

8. The information processing device according to claim 7, wherein the voice information includes content information indicating visually recognizable content of the indication target.

9. The information processing device according to claim 8, wherein the content information indicates at least one of a name of the indication target, a type of the indication target, or a thing visually expressed by the indication target.

10. The information processing device according to claim 7, wherein based on a change of the indication target after the correction of the target in the image, the output control unit is further configured to control output of a notification sound that gives a notification of the change of the indication target.

11. The information processing device according to claim 10, wherein the output control unit is further configured to control the output of the notification sound based on a movement direction of the indication target.

12. The information processing device according to claim 7, further comprising:
a translation unit configured to translate the information associated with the indication target into the determined language.

13. The information processing device according to claim 1, further comprising:
an object detection unit configured to detect an object in the image.

14. The information processing device according to claim 1, wherein the indicating object is a part of a user body.

15. The information processing device according to claim 1, further comprising:
a voice recognition unit configured to recognize the user voice.

16. An information processing method, comprising:
    detecting a spatial indication position, wherein the spatial indication position is a position pointed by an indicating object in a three-dimensional space;
    detecting an indication target in an image, wherein the indication target corresponds to a first target pointed by the indicating object in the three-dimensional space;
    correcting an image indication position in the image, wherein
    the image indication position corresponds to the spatial indication position, and
    the image indication position is corrected based on a user voice spoken by a user;
    performing no correction of the indication target based on a match between the indication target and a second target based on the user voice; and
    correcting a target in the image which corresponds to the second target to the indication target, wherein the target in the image is corrected based on the indication target that does not match the second target.

17. A non-transitory computer-readable medium having stored thereon, computer-executable instructions which, when executed by a computer, cause the computer to execute operations, the operations comprising:
    detecting a spatial indication position, wherein the spatial indication position is a position pointed by an indicating object in a three-dimensional space;
    detecting an indication target in an image, wherein the indication target corresponds to a first target pointed by the indicating object in the three-dimensional space;
    correcting an image indication position in the image, wherein
    the image indication position corresponds to the spatial indication position, and
    the image indication position is corrected based on a user voice spoken by a user;
    performing no correction of the indication target based on a match between the indication target and a second target based on the user voice; and
    correcting a target in the image which corresponds to the second target to the indication target, wherein the target in the image is corrected based on the indication target that does not match the second target.

* * * * *